Sept. 14, 1943.  G. C. ELLERBECK  2,329,190
DECIMAL POINT INDICATING MECHANISM
Filed July 12, 1940   13 Sheets-Sheet 1

INVENTOR.
GRANT C. ELLERBECK
BY
ATTORNEY.

Sept. 14, 1943.　　　G. C. ELLERBECK　　　2,329,190
DECIMAL POINT INDICATING MECHANISM
Filed July 12, 1940　　　13 Sheets-Sheet 2
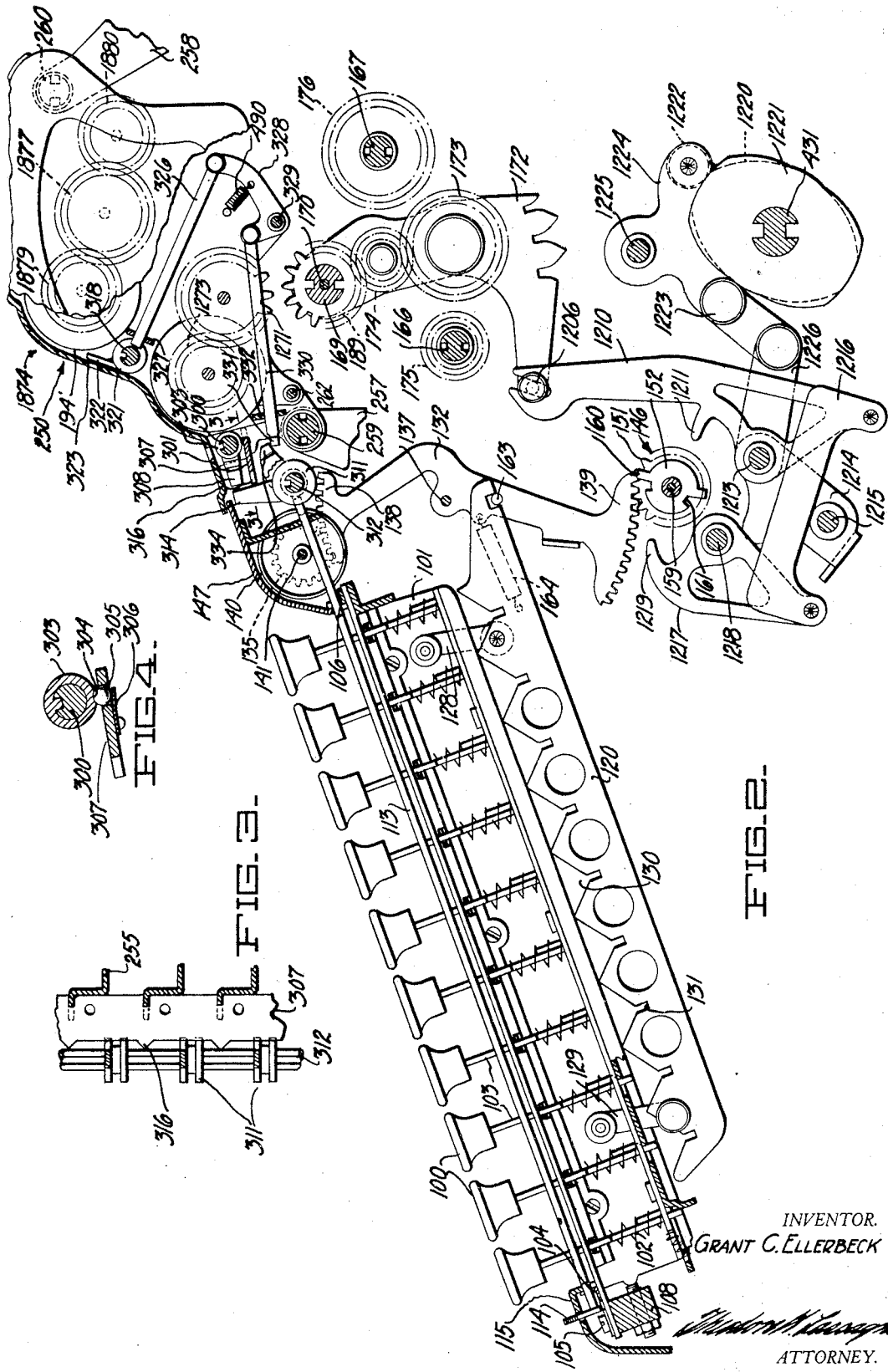
INVENTOR.
GRANT C. ELLERBECK
ATTORNEY.

Sept. 14, 1943.　　　G. C. ELLERBECK　　　2,329,190
DECIMAL POINT INDICATING MECHANISM
Filed July 12, 1940　　　13 Sheets-Sheet 4

INVENTOR.
GRANT C. ELLERBECK

ATTORNEY.

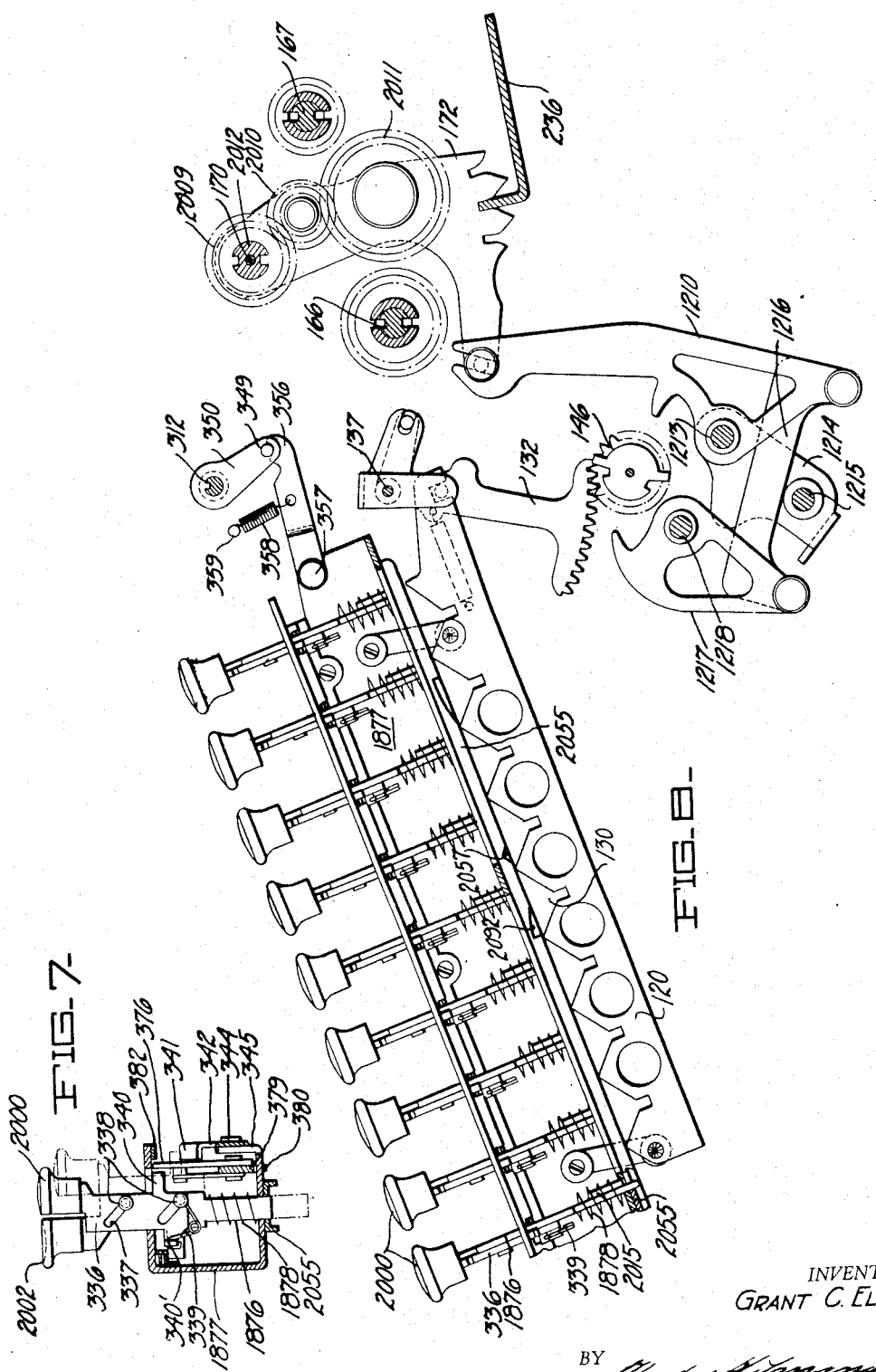

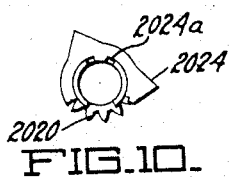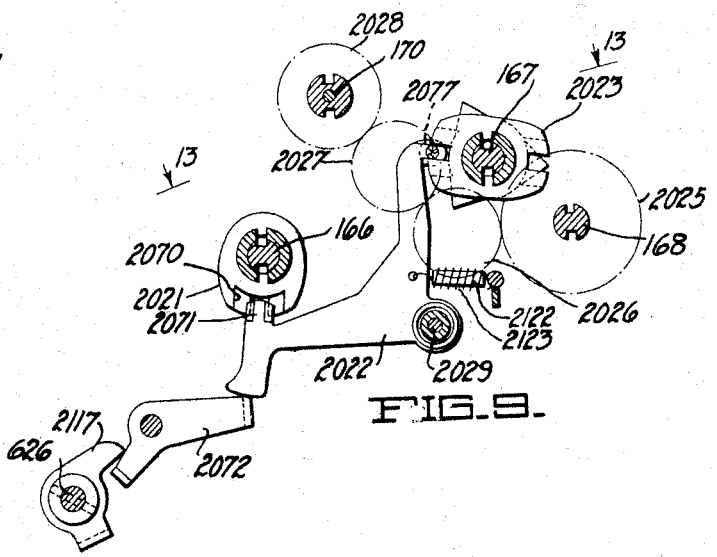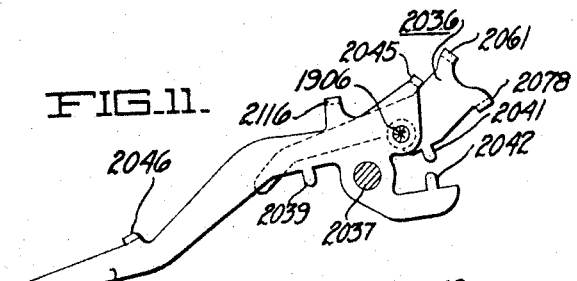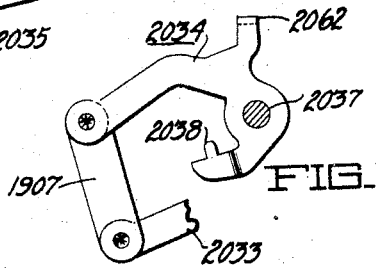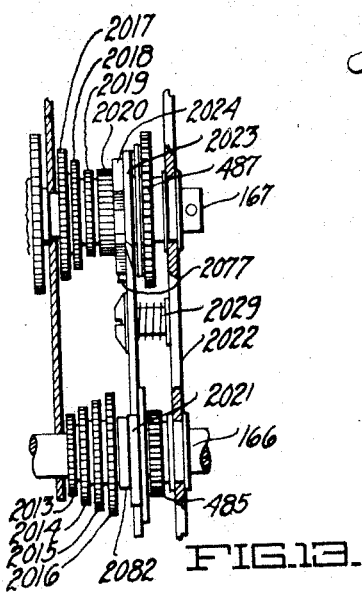

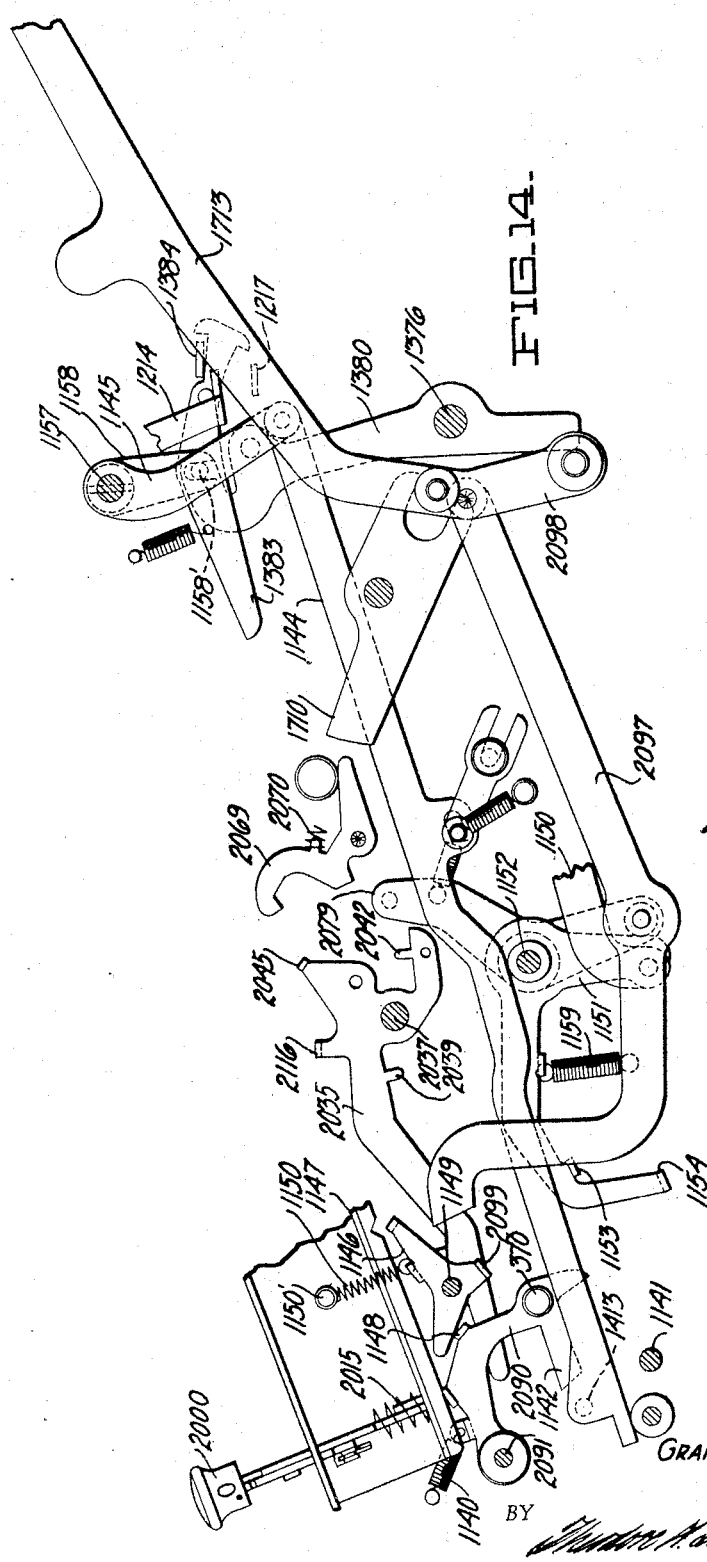

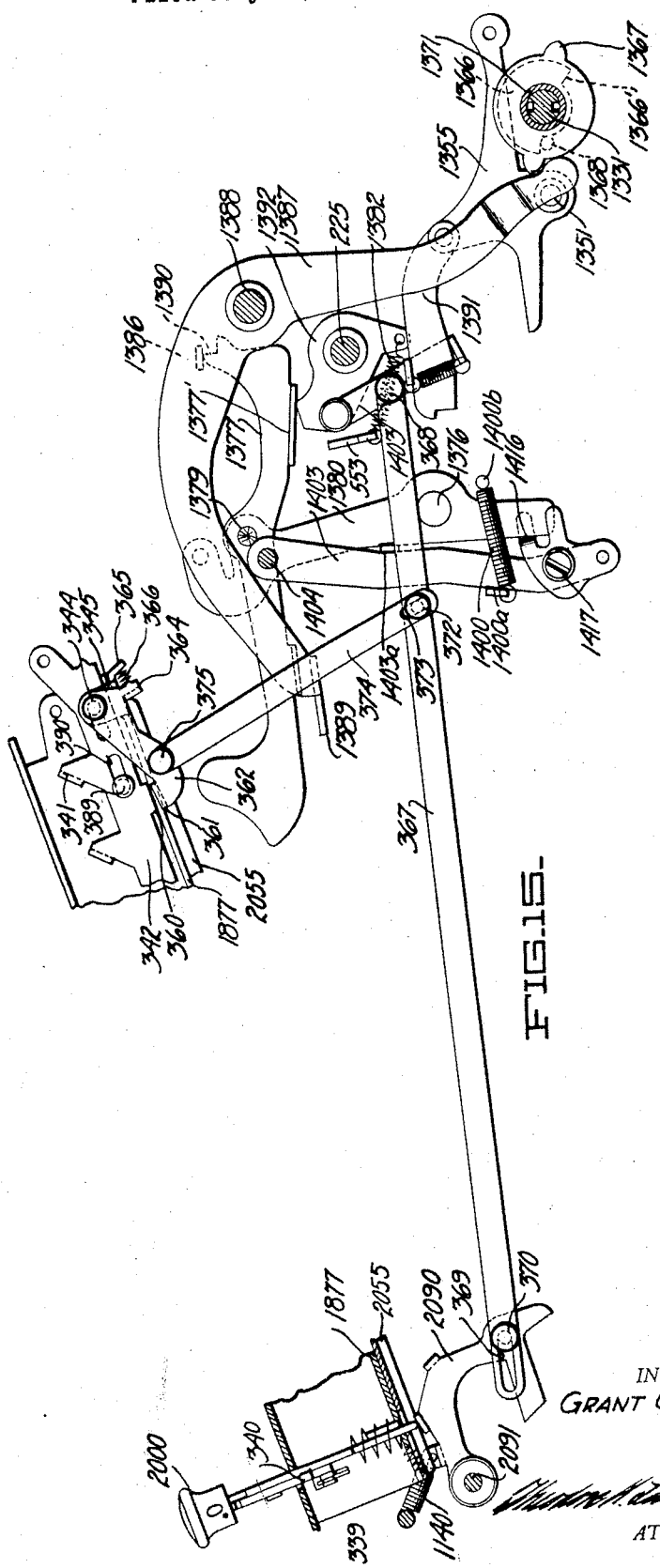

Sept. 14, 1943.                G. C. ELLERBECK                 2,329,190
                      DECIMAL POINT INDICATING MECHANISM
                Filed July 12, 1940            13 Sheets-Sheet 9
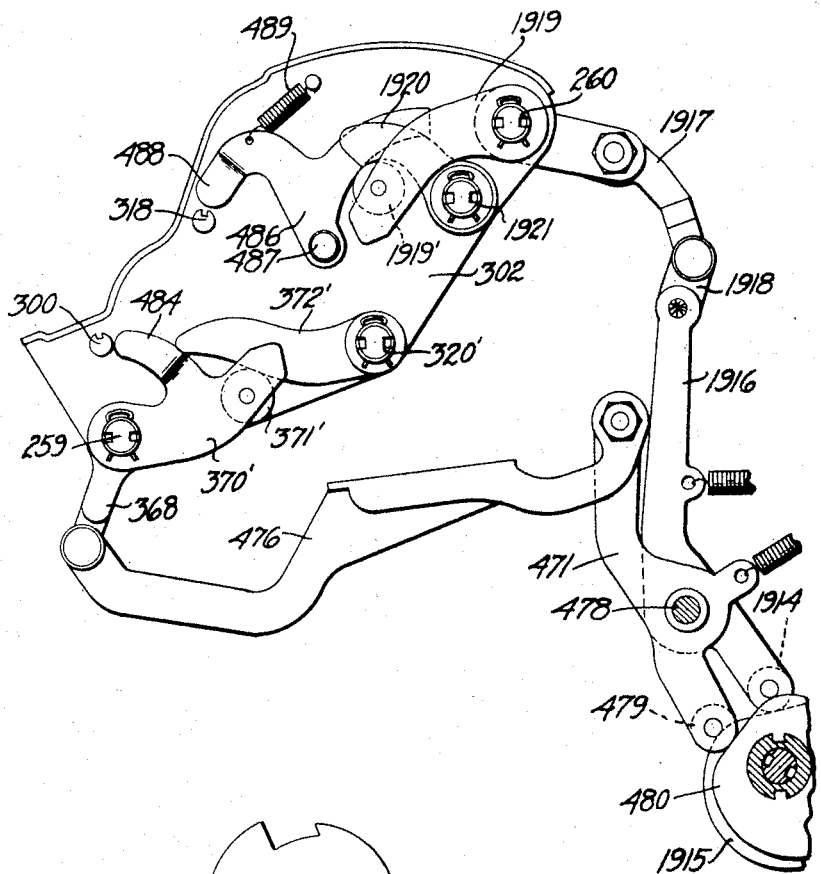
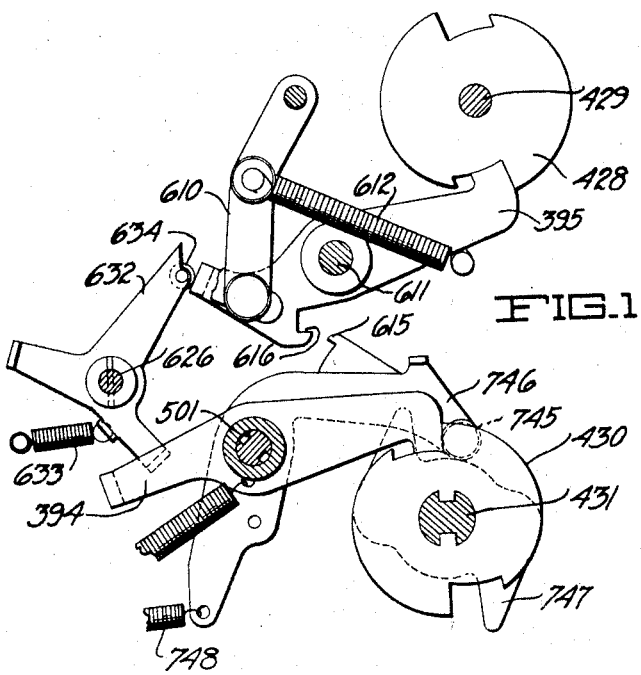
INVENTOR.
GRANT C. ELLERBECK
ATTORNEY.

Sept. 14, 1943. G. C. ELLERBECK 2,329,190
DECIMAL POINT INDICATING MECHANISM
Filed July 12, 1940 13 Sheets-Sheet 11
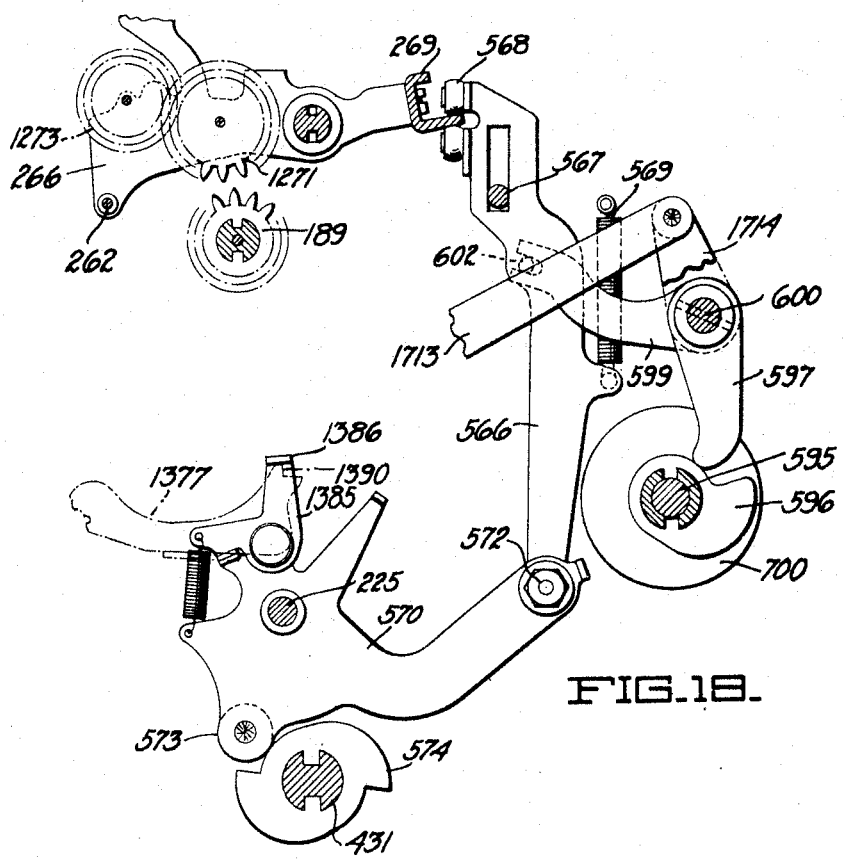
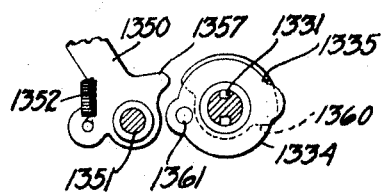
INVENTOR.
GRANT C. ELLERBECK
BY
ATTORNEY.

INVENTOR.
GRANT C. ELLERBECK

ATTORNEY.

Sept. 14, 1943.   G. C. ELLERBECK   2,329,190
DECIMAL POINT INDICATING MECHANISM
Filed July 12, 1940    13 Sheets-Sheet 13

INVENTOR.
GRANT C. ELLERBECK
BY
ATTORNEY.

Patented Sept. 14, 1943

2,329,190

UNITED STATES PATENT OFFICE 2,329,190

DECIMAL POINT INDICATING MECHANISM

Grant C. Ellerbeck, Long Beach, Calif., assignor to Marchant Calculating Machine Company, a corporation of California Application July 12, 1940, Serial No. 345,116

32 Claims. (Cl. 235—63)

This invention relates to calculating machines and has particular reference to mechanism for automatically indicating the position of the decimal points of factors and results of a calculation on a calculating machine, such as the multiplier and the product in multiplication calculation.

Heretofore, the position of the decimal point in the product of a multiplication has usually been found by mentally adding the number of pointed off decimal places of the multiplier and multiplicand, and then indicating the position of the decimal point in the product by moving a decimal pointer or indicator along the product register to point off a number of places equal to the sum thus ascertained. This not only entails extra manipulation and mental effort on the part of the operator, but also frequently introduces errors.

The principal object of the present invention is to automatically determine and indicate the position of the decimal point in a product registered in a product register of a calculating machine.

Another object of the invention is to eliminate extra manipulation for the purpose of controlling setting of the multiplier decimal point indicator.

Another object of the invention is to provide manually operable devices for controlling setting of the decimal point indicator of the multiplier and product registers, which will be rendered ineffective after a single operation in any calculation.

A further and more specific object of the invention is the provision of mechanism whereby the setting of the multiplier and product decimal point indicators may be controlled by manually operable devices used to control the operation of the machine in multiplication.

Another object of the invention is to provide an improved decimal point indicating mechanism which will be set by power derived from the motor during machine operation, under control of manually set devices.

Another object of the invention is the provision of improved forms of decimal indicators and setting devices therefor.

A further object of the invention is to effect clearing of a decimal indication automatically upon clearing of a register.

The present invention is disclosed herein in its preferred form as embodied in the commercial known "Marchant" calculating machine which is disclosed in the copending application of Avery, Serial Number 84,927 filed June twelfth, 1936, and since matured into Patent Number 2,271,240 issued on January twenty-seventh, 1942 to which patent reference is had for a complete disclosure of the calculating machine, including mechanism not specifically disclosed herein. However, with certain modifications, the invention is equally applicable to other calculating machines.

The manner in which the above and other objects of the invention are accomplished will be readily understood on reference to the following specification when read in conjunction with the accompanying drawings, wherein:

Figure 2 is a longitudinal sectional view, as viewed from the right side of the machine embodying the present invention.

Figure 3 is a fragmentary sectional view illustrating the camming bar and its relation to the various decimal setting slides, and is taken along the line 3—3 of Figure 2.

Figure 4 is a fragmentary sectional view illustrating the yieldable means for holding each of the decimal sleeves in either of their alternate positions.

Figure 7 is a transverse sectional view through the multiplier key section, and is taken along the line 7—7 of Figure 6.

Figure 8 is a longitudinal sectional view of the multiplier unit, illustrating the manner in which selection may be made of a multiplier value.

Figure 9 is a sectional detail view showing mechanism for automatically controlling the termination of a multiplication operation.

Figure 10 is a detail of the lost motion connection between the gear 2020 and cam 2024.

Figures 11 and 12 illustrate details of the construction of certain of the levers illustrated in Figure 6.

Figure 13 is a sectional plan view taken substantially on line 13—13 of Figure 9.

Figure 14 is a longitudinal sectional view illustrating the zero multiplier key and the carriage shift control mechanism associated therewith.

Figure 15 illustrates the means controlled by the zero multiplier key and the carriage shifting mechanism for delaying operation of the setting bar.

Figure 16 is a view, looking from the right side of the machine, with parts in section, illustrating the mechanism for clearing the accumulator and counter registers, as well as decimal indicating mechanism.

Figure 17 is a side elevational view of part of the mechanism for controlling operation of the main clutch.

Figure 19 is a sectional elevational view showing the carriage dipping mechanism.

Figure 20 is a fragmentary view illustrating the lost motion latch operating means for the shift mechanism.

Manually set selection mechanism

The machine in connection with which the present invention is illustrated, is of the key-set type in which means are provided for first setting one factor of the calculation upon a keyboard and subsequently operating the machine by manipulation of a separate control bar or key, in a manner indicated by the character and amount of another factor of the calculation.

The mechanism for setting up the first factor may be considered as comprising a manually operated and a power portion, the manually operated portion being designed to be moved to a selected controlling position by the depression of keys, and the power operated portion being designed to be brought into operation by control keys and to operate the various calculating mechanisms under control of the manually set mechanism.

Figure 1:
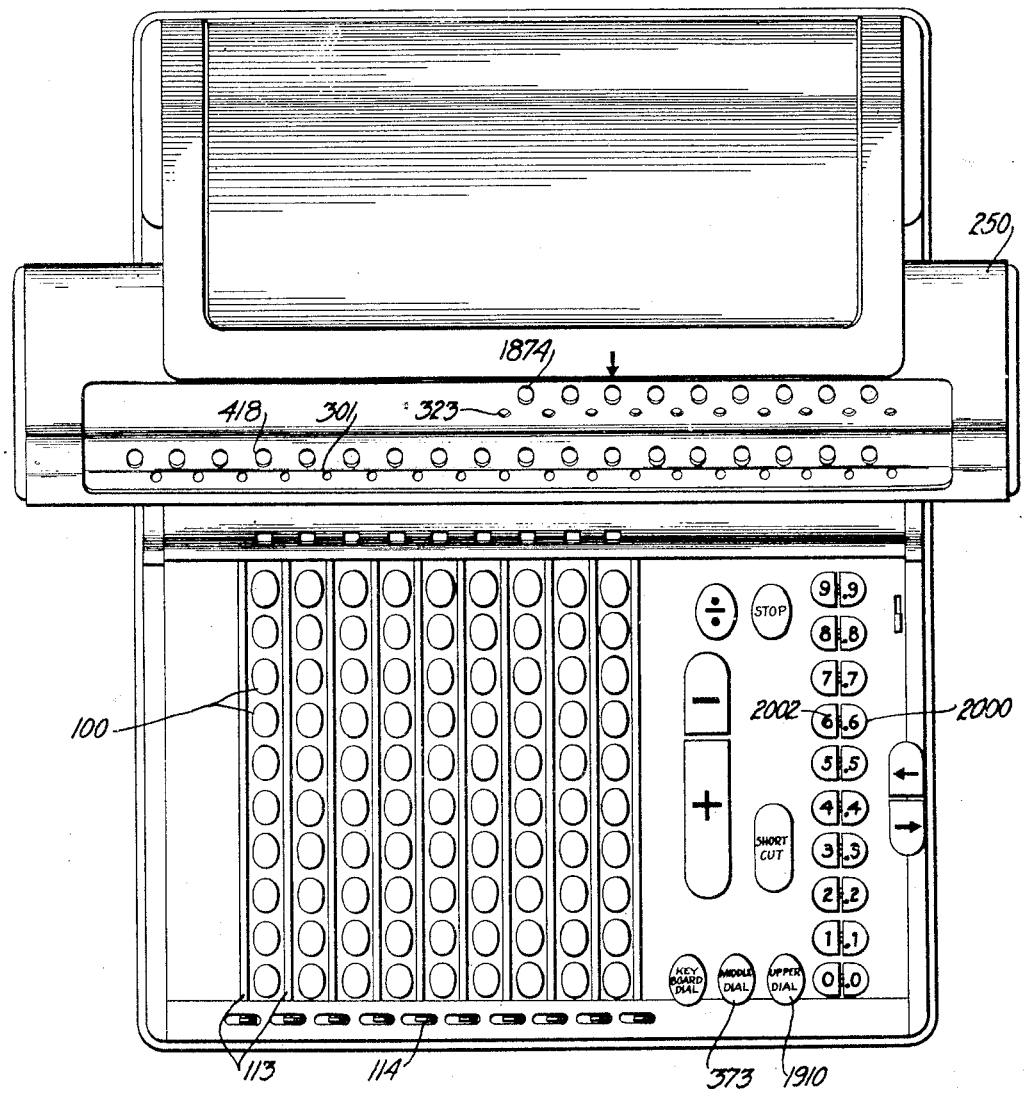
Figure 1 is a plan view of a calculating machine embodying the present invention and showing the location of the various control devices including the decimal multiplier keys.

As viewed in Figure 1, the various value selecting keys 100 are arranged in a series of banks of nine keys each, the number of such banks depending upon the magnitude of the factor with which the machine is designed to deal. Each key bank comprises a key frame 101 (Figure 2) in which the key stems 103 of the various keys 100 are slidably mounted. All of the key stems 103 are of the same length, and compression springs 102 are mounted on the same to normally maintain all of the keys 100 in a raised position.

Disposed beneath the value keys is a differentially settable bar 120 (Figure 2) which is pivotally suspended from the key section frame 101 by means of two parallel links 128 and 129. This bar 120 has nine identical divergent notches 130, each of which terminates in a rectangular slot 131 proportioned to receive the end of the corresponding key stem 103 so that the bar 120 will be accurately positioned thereby.

The key stems 103 are spaced an equal distance apart and this distance is slightly greater than the spacing between successive slots 131 so that each succeeding slot 131 will be spaced one increment further away from its cooperating key stem; thus, the depression of a value key 100 will cam the bar 120 to the right, as viewed in Figure 2, a number of increments equal to the value represented by the depressed key.

Such movement of each of the bars 120 is utilized to set up a mechanical representation of the selected value to control the calculating mechanism accordingly, and for this purpose a swinging segment member 132 is connected by means of a pin and slot connection 163 to each bar 120, and is pivotally connected upon a common shaft 137 extending across the machine and supporting like members associated with other key banks. A tension spring 164, provided between the segment 132 and a stud suitably supported by the machine frame, normally maintains the segment 132 and bar 120 in the position illustrated in Figure 2 when all of the keys in the corresponding key bank are released.

Each of the segment members 132 is provided at opposite ends thereof with arcuate racks 138 and 139 which serve to transmit movement of the differential bar 120, respectively, to a pinion 135 connected to a check dial assembly 140 rotatably mounted on a shaft 141, and through a gear 151 to a cam unit 146 which is positioned by such movement to form a mechanical representation of the value set up on the associated key bank.

Rockable decimal markers 113 (Figures 2 and 5) are positioned between each bank of keys, and each marker is journaled at the foremost end in a notch formed in a bracket strip 104 which is secured by screws 105 to a cross piece or bar 108. The rearmost end of each of the markers 113 is journaled in a notch formed in a second bracket strip 106 suitably secured on top of the various key frames 101. A finger piece 114 is secured to each marker 113 and extends through a cover member 115 so that the decimal marker may be rocked to expose either of its sides, the markers being shown in the different positions in Figure 5. One side of these markers is colored to correspond with the coloring of the top of the channel 101, while their other side is colored to contrast therewith, so that by turning the selected markers, the keyboard may be set up in any desired manner.

Power set selection mechanism

After the setting of the mechanism heretofore described has been completed, and upon manipulation of one of the operation control keys, the power operated portion of the machine is brought into operation and acts under the control of the cam units 146 to effect entry of a value set up on the keyboard into the accumulator register. Since this power operated mechanism is illustrated in detail in the above mentioned Avery patent, only a brief description of the function of this mechanism is deemed necessary.

Each cam unit 146 comprises a gear 151 and five cams, one of which is shown at 152. Each of the cams has two high points 160 and two low points 161 on its periphery. The cams are so staggered that no high or low point on one cam is aligned with a high or low point on another cam. The various cams on each cam unit 146 are so arranged that upon depression of a value key 100, the gear 151 meshing with the arcuate rack 139, will rotate the cam unit 146 to a position wherein one of the high points of one of the cams will be positioned in the path of a nose 1211 of one of a set of five feeler arms 1210 on one side of the cam unit 146, or in the path of a nose 1219 of one of a set of five feeler arms 1217 on the opposite side of the unit 146.

Upon depression of one of the various operation control keys, such as one of the multiplication control keys 2002 (Figures 1 and 7), a setting clutch dog 394 (Figure 17) is rocked by suitable mechanism to effect engagement of a cyclically operable setting clutch 430, the details of which are also disclosed in the above Avery patent.

Upon engagement of the setting clutch 430, power derived from a driving motor 640 (Figure 18) is transmitted through a train of elements, including gears 645, 646, 647, 362, the latter of which is suitably connected to a gear 648 meshing with a gear 430', through the setting clutch 430 to a setting shaft 431.

Keyed on the setting shaft 431 are a number of pairs of complementary cams identical to cams 1220 and 1221 (Figure 2), and each said pair has an associated cam follower 1224 pivoted on a cross rod 1225, and provided with a roller 1222 in engagement with the cam 1220 and a second roller 1223 in engagement with the cam 1221. As the shaft 431 rotates, the cam followers 1224 are rocked in a clockwise direction and, through links 1226, impart a counter-clockwise rocking movement to a series of levers 1214 rockably mounted on a shaft 1215. A shaft 1213, supported by the levers 1214, has pivotally mounted thereon the groups of feeler arms 1210 hereinbefore described, one of these groups being located adjacent the cam units 146. During the leftward movement of the feeler arm 1210 by the shaft 1213, each of the noses 1211 formed on the feeler arms 1210 engages the periphery of its associated cam on the cam unit 146, thereby causing each feeler arm 1210 to pivot about the point of contact between its respective nose and the periphery of its associated cam. The balance of the forward movement of the shaft 1213 by the cam follower 1224 effects forward movement of the lower end of the feeler arm 1210, and this movement is transmitted through a link 1216 to rock a second feeler arm 1217 aligned with each of the feeler arms 1210. The arms 1217 rock in a clockwise direction about a fixed shaft 1218 until their noses 1219 engage the periphery of the respective cam at a point substantially diametrically opposite that engaged by the nose 1211 of the associated feeler arm 1210.

As was described hereinbefore, each of the cam units 146 is so arranged that only one of the associated pairs of feeler arms 1210 and 1217 will have its respective noses in engagement with the high and low points of a cam at any one setting of the value keys 100 in the respective key section. Thus, one of the feeler arms 1210 will be rocked a considerable angle about its supporting shaft 1213 to one side or the other of a medial position, depending upon whether its nose 1211 is in engagement with a high point 160 or a low point 161 of its respective cam. All of the other cams in the cam unit will, since their noses are held the same distance apart from the cam supporting shaft 159 by the remaining cam, be held in their respective medial positions, causing their upper slotted ends to attain a position substantially as shown in Figure 2.

Each of the feeler arms 1210 is connected to a pin and slot connection 1206 with a plate 172 pivoted on a sleeve 169 journaled on a shaft 170, and arranged on each plate is a set of gears 174 and 173, the former meshing with a laminated gear 189 mounted on the sleeve 169.

From the above it will be seen that four of each group of five of the selection plates 172 will be held in a medial position substantially as shown in Figure 2, while the fifth will be moved forward or rearward until the lowermost gear 173 thereof meshes, for example, with an aligned gear 175 on a shaft 166, or an aligned gear 176 on a shaft 167.

Gear 175 is one of a group of four gears 177 (Figure 18), keyed on the shaft 166, and adapted to mesh with gears on four of the selection plates 172. Likewise, the gear 176 forms one of a group of five years 178 mounted on the shaft 167 and adapted to mesh with gears on the five selection plates 172. The three leftmost gears of this latter group are keyed to the shaft 167, while the two rightmost gears 188 and 199 are free on the shaft 167 and mesh with gears 195 and 200, respectively, keyed on a third shaft 168.

The shafts 166, 167, and 168 are connected to the motor 640 (Figure 18) in a manner described hereinafter, so that the shaft 166 rotates through 180° for each cycle of operation of the machine, and the shaft 167 rotates through 90° for each cycle of operation of the machine, while the shaft 168 rotates through 30° for each cycle of operation. The diameters of the various gears in the two gear groups 177 and 178 corresponding to each keyboard order, are so arranged that for each machine cycle, the gear 189 (Figure 2) will be rotated by one of the gears of the group 177 and 178, a number of increments corresponding to the value of the key 100 which is depressed during a machine cycle. If no key is depressed, the selection plates 172 will be so arranged that none of the gears of the groups 178 and 177 will become operative to drive the gears 173.

At the start of the machine cycle, and in advance of rotation of the gears 189, a gear 1271 (Figures 2 and 19) having a gear 1273 of the accummulator register mechanism meshing therewith, is dipped under control of the setting shaft 431, by means to be described hereinafter, to mesh with the gears 189 and thereby transmit rotation to a numeral dial 194 of the accumulator register visible through opening 418 (Figure 1) in the carriage cover. Suitable tens carrying mechanism (not shown) is provided as disclosed in detail in the above mentioned Avery patent.

As was mentioned hereinbefore, the various gears on shafts 166, 167, and 168 are adapted to be driven by the motor 640 (Figure 18) and for this purpose a cyclically operable main clutch, diagrammatically illustrated at 428 (Figures 17 and 18), is provided to control rotation of these shafts. Clutch 428 is entrained with the hereinbefore mentioned drive 362 through a pinion 650 and a gear 415 connected to the driven side of the clutch 428. During each cycle of operation of the clutch 428 (one-half revolution thereof), a one-half revolution is transmitted to a shaft 429 and this rotation is, in turn, transmitted through a reversible transmission (not shown), through gears 458 and 484 to the shaft 166. The shaft 166 is entrained with the shaft 167 through gears 485, 486, and 487, while the shaft 168 is entrained with the shaft 167 through gears 488 and 489.

Initiation of operation of the main clutch 428 is controlled by the setting clutch 430, and for this purpose a cam 747 (Figure 17) is keyed on the setting shaft 431 and engages a roller 475 carried by a cam follower 746 pivotally mounted on a shaft 541 and urged into engagement with the cam 747 by a tension spring 748. After the various feeler arms 1210 and 1217, and the selection plates 172 have been positioned under control of the complementary cam 1220 and 1221, the cam 747 engages and rocks the cam follower 746 counter-clockwise, enabling a tip 615 carried thereby to engage the notch 616 formed in a main clutch 395 pivoted on a shaft 611, and normally held in engagement with the main clutch 428 through a toggle link arrangement 610 and tension spring 612. As the cam follower 746 causes the tip 615 to engage and rock the dog 395 out of engagement with the clutch 428, this clutch couples the shaft 429 with the continuously driven gear 415 and thus effects actuation of the various actuator gears 177 and 178.

Suitable means (not shown) such as disclosed in the above mentioned Avery patent are provided for actuating a counter or multiplier register (Figures 1 and 2), so as to register the number of main clutch cycles during an operation, and therefore display the multiplier in multiplication. Such means includes, in part, a train of gears 1888, 1877, and 1819 in each order of the register, the latter gear being connected to a numeral dial 194' through suitable tens carry mechanism (not shown).

Carriage dipping

The carriage 250 is mounted for transverse movement relative to the machine frame and to the actuating mechanism including the gears 189, by a pair of parallel shafts 259 and 260, which are suitably secured to the carriage and slidable in bearings formed in brackets 257 and 258, respectively, extending from the machine frame. To enable such transverse shifting of the carriage, the hereinbefore mentioned accumulator register 418 and gears 1271 and 1273 connected thereto are normally held in a raised position as illustrated in Figure 2. However, at the start of a machine cycle, and in advance of rotation of the gears 189, the gears 1271 are dipped to mesh with the gears 189 to transmit rotation to the accumulator register. To this end, the accumulator register and gears 1271 and 1273 are mounted on a series of plates 266 (Figure 19) pivotally supported on a cross rod 262 suitably secured to the carriage 250.

The means for dipping the various plates 266 comprises links 566, slidable at their upper ends over pins 567, and connected at their lower ends to cam follower levers 570 by means of pivot pin 572. Levers 570 have rollers 573 rotatably mounted thereon and extending in an engagement with cams 574 secured on the setting shaft 401. Thus, the links 566 are positively pulled down by the operation of the setting clutch against the action of tension spring 569 connected between the links 566 and studs suitably secured to the machine framework. Each link 566 is provided with rollers 568 between which is guided a ball 266, suitably secured to the various plates 266, to enable dipping of the accumulator register regardless of the position of the carriage 250 relative to the stationary portion of the frame.

Suitable means (not shown) is provided for latching the links 566 in their lowermost position until the end of one or more machine cycles as determined by the type of calculation being performed, and in order to prevent the carriage from rising too rapidly when the links 566 are released from such latching means, a cam 596 is provided. This cam is engaged by a cam follower arm 597 pinned to a rockable shaft 600 which has a series of arms 599 also pinned thereto and connected by pin and slot connections 602 to the various links 566. The cam 595 is rotated by a restore clutch diagrammatically illustrated at 700 (Figures 18 and 19) which is engaged by movement of the main clutch dog 395 (Figure 17) to clutch disengaging position by suitable means such as is disclosed in detail in the above Avery patent.

Carriage shifting mechanism

Figure 21:
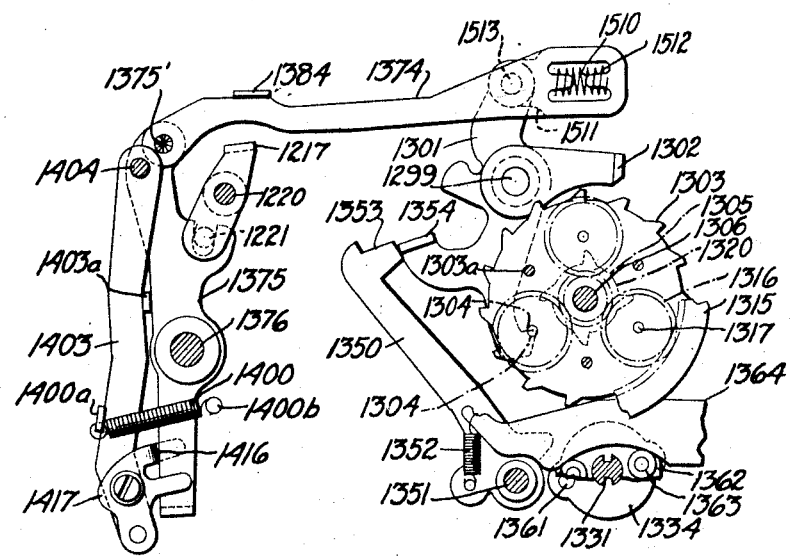
Figure 21 is a sectional elevational view showing certain of the mechanism utilized for effecting a power shift of the carriage and controls therefor.
Figure 22:
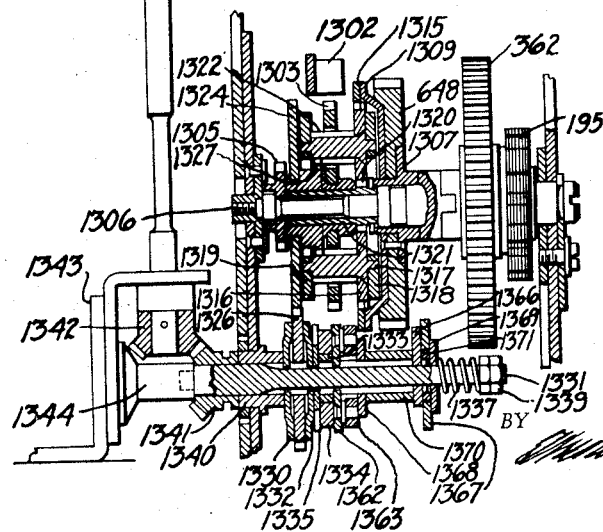
Figure 22 is a transverse sectional view through the carriage shift transmission, the construction of the same, and its connection to the carriage.

As is shown in Figure 22, the hereinbefore mentioned motor driven gears 362 and 648 are rotatably mounted on the shaft 1306, the latter gear being mounted on flange 1307 which is keyed to the hub of the gear 362. Gear 648 has secured thereto a dished supporting disc 1309, to which is welded an internal gear 1315. Gear 1315 is in mesh with three equi-spaced planetary gears 1316 (Figures 21 and 22) riveted to each of three shafts 1317. These three shafts extend through clearance holes provided in a ratchet wheel 1303, and have end bearings in plates 1318 and 1319. These plates and the ratchet wheel 1303 are secured together as a rigid unit by studs 1303a. The planetary gears 1316 also mesh with a sun gear 1320 formed at one end of a sleeve 1321 to the opposite end of which is suitably keyed a second ratchet wheel 1305. Both the sleeve 1321 and the ratchet wheel 1305 are journaled on the shaft 1306.

Gear teeth 1322 are formed on each shaft 1317 and these mesh with a second sun gear 1327 to which is secured a gear 1324, meshing with a gear 1326 which is rotatably mounted on a shaft 1331. This latter gear is held between a pair of friction discs 1330 and 1332 which are keyed to the shaft 1331. A compression spring 1337 is provided to press the discs 1330 and 1332 against the gear 1326. Interposed between the compression spring 1337 and the friction disc 1322 are a disc 1335 splined to shaft 1331, a sleeve 1333, a second disc 1362 also splined to the shaft 1331, and supporting a pair of diametrically opposed rollers 1363, a washer 1368, a sleeve 1370, a driving disc 1366 splined to the shaft 1331, a sleeve 1371, and a washer 1369. A pair of lock nuts 1339 are adjustable on the threaded end of shaft 1331 to regulate the amount of friction applied between the gear 1326 and its friction discs 1330 and 1332.

The shaft 1331, driven by the reversible gear transmission through the gear 1326, is journaled in a bearing 1340 and in a second bearing 1344 supported by a bearing bracket 1343. A bevel gear 1341, secured on the shaft 1331, meshes with a second bevel gear 1342 fixed on the lower end of a vertical shaft 344. This shaft is journaled in bearings provided in brackets 358 and 1343, and has fixed at the upper end thereof a hub and plate assembly 356 on which are mounted rollers 357 adapted to engage between the teeth of a rack 355, which is suitably mounted on the carriage 250. Thus, upon rotation of the assembly 356 by the planetary transmission mechanism, the rollers 357 will engage between the teeth of the rack 355 and shift the carriage 250 laterally either to the left or to the right, depending upon the direction of rotation of the shaft 334.

The shaft 1331 may be selectively rotated in either direction to effect a shift of the carriage 250 either to the right or to the left, by holding one or the other of the ratchet wheels 1303 and 1305 from rotation. If the ratchet wheel 1303 is held, rotation of the planetary gears 1316 about the sun gear 1320 will be prevented and the planetary gears will function as idlers to transmit rotation from the internal gear 1315, driven by the gear 362 through their integrally connected gears 1322 to the sun gear 1327, whereby the gear 1324 will be rotated in one direction. However, when the other ratchet wheel 1305 is held, thereby holding stationary the gear 1320 integrally attached thereto, the rotation of internal gear 1315 will feed the planetary gears 1316 about the fixed sun gear 1320 with which they mesh, causing them to rotate on their own centers and also to rotate about the sun gear 1320, thereby driving the gears 1324 in an opposite direction.

To effect such selective shifting of the carriage, a clutch member 1301 (Figure 21) is provided. The member 1301 has a pair of dogs 1302 and 1304 extending therefrom, the former being adapted to engage and hold the ratchet wheel 1303 from rotation when the member 1301 is rocked in a clockwise direction, as viewed in Figure 21, while the latter dog 1304 is adapted to engage and hold the ratchet wheel 1305 against rotation when the member 1301 is rocked in a counterclockwise direction. If the clutch member 1301 is held in a neutral position, as illustrated in Figure 21, wherein neither of the dogs 1302 and 1304 is engaged, the differential merely idles and there is no drive to the shifting mechanism.

Means are provided whereby either of the dogs 1302 and 1304 is held in engagement with its respective ratchet wheel during approximately the first three-quarters of a shift cycle to positively insure the completion of any initiated shift, regardless of how soon the control member 1301 is urged toward its neutral position after having once been moved to shift controlling position. On a leftward extension of the clutch control member 1301 (Figure 21) is a laterally extending ear 1354 adapted to be engaged with either the top or bottom surfaces of a projection 1353 formed on a latch member 1350, said latch member being pivotally mounted at 1351 and urged for engagement with the ear 1354 by a spring 1352 (Figures 20 and 21). When the control member 1301 is rocked either clockwise or counterclockwise from its neutral illustrated position, the projection 1353, normally held in the position shown by the ear 1354, will snap into latching position either above or below the ear 1354 under tension of the spring 1352 and thereby latch the clutch member 1301 against return movement into its neutral position until shift has progressed through approximately three-quarters of its clearance cycle, at which time it will be released by the latch member 1350.

Provision is made for additionally tensioning the spring 1352 during the first portion of the shift cycle, and for this purpose, a centralizer 1364 (Figure 21), is utilized, the upper end of spring 1352 being attached to the extreme left end thereof. The centralizer 1364 is pivotally supported at its right hand end (not shown) and is held in engagement with the two diametrically opposed rollers 1362 by the spring 1352. When the shaft 1331 starts to rotate at the beginning of a shift cycle, one of the rollers 1363 carried on the disc 1362, which is keyed to the shaft 1331, cams the centralizer 1364 upwardly, thereby increasing the tension of the spring 1352.

Provision is made for moving the latch member 1350 from latching engagement with the clutch member 1301 upon completion of approximatey three-quarters of the shift cycle. For this purpose, a cam 1334 (Figure 20) having a pair of diametrically opposed lobes formed thereon, is rotatably mounted on the sleeve 1333 and is driven by the disc 1335 keyed to the shaft 1331 so as to cam a nose 1357 formed at the lower end of the latch member 1350 at the end of approximately three-quarters of a shift cycle.

To insure the same cyclic time of operation of the clutch member 1350 for reverse rotation of the shaft 1331, the disc 1335 is provided with two shoulders 1360 disposed approximately 180° apart, so that a pin 1361 secured on the cam 1334 will, upon clockwise rotation of the shaft 1331, be engaged by the shoulder 1360 on the opposite sides of the disc 1335 (Figure 20) only after the disc has been rotated about three-eighths of a revolution, which is about three-quarters of a shift cycle. Thus, although the drive to the carriage shift mechanism is thus terminated at approximately three-quarters cycle position, the shift drive train will be rotated through the remainder of its cycle by the centralizer 1364, which is pressed by the spring 1352 against rollers 1363 on disc 1362. In addition to completing the shift cycle, the centralizer 1364 also serves to restrain any movement beyond the end of the shift cycle so that the carriage will always come to rest in operating position.

The clutch member 1301 is pivotally connected at 1315 (Figure 21) to a short link 1511 having a pair of opposed lugs 1510 formed thereon. In juxtaposition with link 1511 is a second link 1374 having identically shaped lugs 1510 formed thereon. Links 1374 and 1511 are yieldably connected together by a compression spring 1512 located over the four lugs 1510. Link 1374 is pivotally connected at 1375' to a lever 1375 rockably mounted on a stationary shaft 1376.

Provision is made for returning the clutch member 1301 to its neutral illustrated position when not restrained in clutch controlling position by the latch member 1350, or by means described hereinafter. This comprises a centralizer 1403 which is pivotally mounted on the machine frame at 1404. A lug 1403a extends laterally from the centralizer 1403 into engagement with the lever 1375 above the shaft 1376, while an adjustable lug 1417 having an offset 1416 is mounted on the lower end of the centralizer 1403 and engages the lever 1375 below the shaft 1375. A tension spring 1400 extends between an ear 1400a on the centralizer and a stud 1400b on the machine frame to urge the centralizer against the lever 1375. Thus, the centralizer 1403 tends to maintain the lever 1375 in a neutral position in which the clutch member 1301 will be ineffective, and will return the member into this neutral position automatically upon release of the latch 1350, provided the link 1374 is not restrained against movement by other shift controlling mechanism.

Multiplier unit

The preferred embodiment of the present invention includes automatic multiplication control mechanism comprising a bank of automatic multiplier keys 2002 shown in Figure 1 adjacent the right hand side of the machine, and under control of which multiplication may be automatically effected.

These multiplier keys have their key stems 1876 slidably mounted in a key frame 1877 (Figures 6, 7, and 8), and each has supported thereby a decimal setting key 2000 to be described in detail hereafter. Because of the close proximity of the keys 2000 with the keys 2002, the latter are preferably provided with concave key tops while the former are provided with convex tops, as shown in Figure 7, to enable the operator to distinguish between the two merely by the sense of touch.

The keys 2002 are each normally held in raised position by a compression spring 1878 extending the lower flange of the key frame 1877 and a shoulder formed on the key stem 1876.

The multiplier key section includes the usual differentially settable bar 120 (Figure 8) which is set by the multiplier keys of the "2" to "9" values to move the selection segment member 132 mounted on the shaft 137. The machine being normally conditioned for single cycle operation, no control of the multiplier selection by the "1" key is necessary. The member 132 is substantially like the same member disclosed in Figure 2, except that it does not have the upper segment arm for setting a check dial.

As has been disclosed in connection with the manually set selection mechanism, the swinging member 132 is likewise effective to rotate a selection cam unit 146 similar to that described in detail in connection with Figure 2.

Figure 18:
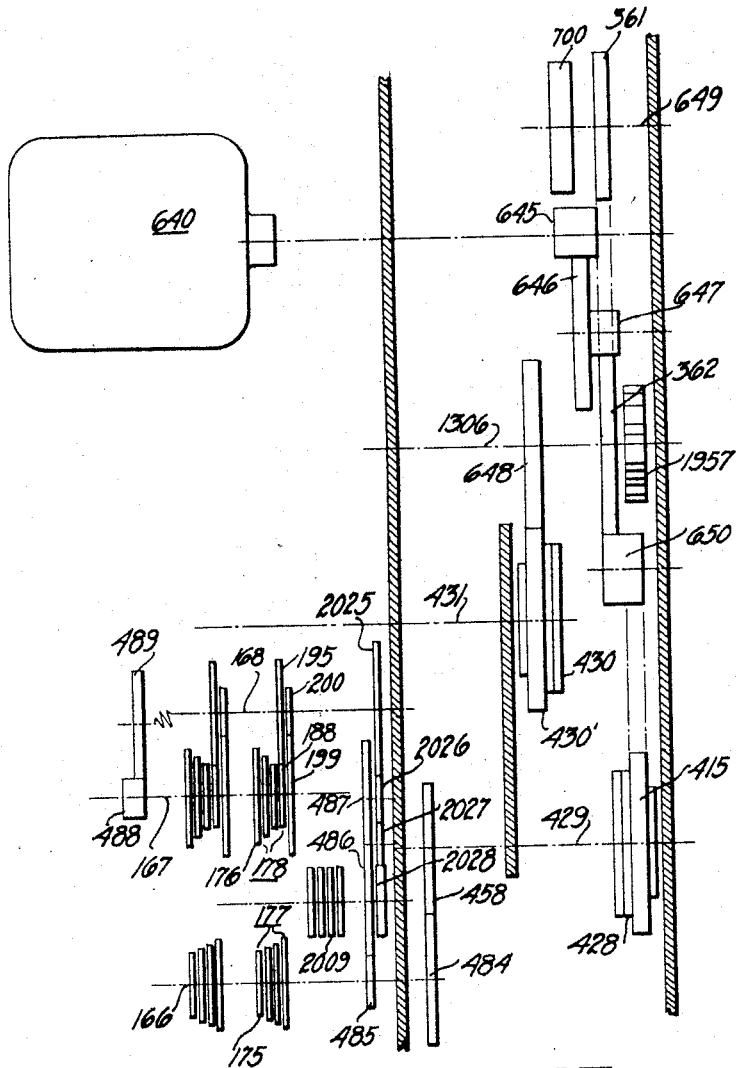
Figure 18 is a schematic view showing the various units and their relationship to the driving motor.

The multiplier unit also includes sensing members 1216 and 1217 (Figure 8) which, in the same way as has been disclosed in connection with the earlier described power set selection mechanism, are effective to sense the setting of the present cam unit 146 and, when a selection gate 236 is released from engagement with the plates 172 by the setting shaft 431 in a manner not described, the active arm 1210 positions the corresponding plates 172 in the usual manner. The plates 172 are pivoted on the shaft 170 and have driven gears 2010 and 2011 rotatably mounted thereon, the former of which meshes with gears 2009 (Figures 8 and 18).

The gears 2009 are secured together as a rigid unit by a sleeve 2012 supported by the shaft 170, and the sleeve 2012 is driven by the twelfth-speed shaft 169 through a gear train (Figures 9 and 18) including a gear 2025 on the shaft 168, idlers 2026 and 2027, and a driven gear 2028 secured to the sleeve 2012. Since the shaft 168 is rotated whenever the main clutch is engaged, the gears 2011 (Figure 8) are driven thereby by the gears 2009.

As was developed in connection with the previously described power set selection mechanism, any one of the group of plates 172 may be selectively moved to engage its gear 2011 carried thereby with gears which, in this case, are carried by sleeves rotatably mounted on the shaft 166 and 167. Movement of these gears is utilized to control the number of cycles of operation of the main clutch 428 and thereby effect a multiplication or multiple addition of any factor set up in the keyboard.

The driven sleeve rotatably mounted on the half-speed shaft 166 (Figures 9 and 13) carries gears 2013, 2014, 2015, and 2016 connected thereto as a unit, while the driven sleeve rotatably mounted on the quarter-speed shaft 167 carries gears 2017, 2018, and 2019 connected together as a unit. These gears are mounted on the shafts 166 and 167 for the sake of convenience and are not connected thereto. A gear 2020 is also rotatably mounted on the shaft 167 but is not connected to the sleeve carrying the gears 2017, 2018, and 2019. The ratio of these gears 2013 to 2019, inclusive, to the gear driving them, is such that they provide selection ratios extending from a "9" multiplier to a "3" multiplier, whereas the gear 2020, as will presently appear, provides in combination with other mechanism, the "2" selection mechanism.

It will be seen from the above that, depending upon the selection which has been made, one of the plates 172 is moved either to the right or to the left, as viewed in Figure 8, to engage one of the gears 2013 to 2020, inclusive. The other plates 172 will remain in their neutral position illustrated in Figure 8.

A single cam 2021 (Figures 9 and 13) is attached to the sleeve carrying gears 2013 to 2016, inclusive, and, as will presently appear, is adapted to rock a bell crank 2022 universally pivoted on the frame by means of a loose fitting pin and spring connection 2029 so as to disengage the main clutch and stop the machine, as hereinafter described, after the cam member 2021 has made a single rotation. Thus, for example, gear 2014, which is providing for seven main clutch actuations, and controls multiplication by the value "7," makes one rotation while the main clutch 428 (Figures 17 and 18) is making seven rotations. Since the cam 2021 is connected to the gear 2014, it will likewise make one rotation, and at the end of this rotation is effective to rock the bell crank 2022.

A double cam member 2023 (Figures 9 and 13) is included in the same unit with gears 2017, 2018, and 2019, and is effective upon half a revolution to rock the same bell crank 2022. Thus, for example, gear 2018 is effective to control the multiplication by the value "4," the main clutch making four rotations. During the four main clutch rotations, gear 2018 and the member 2023 make but half a revolution. At the end of this half rotation, the member 2023 is effective to rock the bell crank 2022. Gear 2020, provided for multiplication by the value "2," is connected to a triangular member 2024 (Figures 9, 10, and 13), adapted to cooperate with a roller 2027 on the upwardly extending arm of bell crank 2022. This member is adapted, when gear 2020 is being driven, to rock the bell crank 2022 during the second cycle of main clutch operation.

Depression of any multiplier key from "1" to "9," inclusive, is effective to cause engagement of the setting clutch 430 (Figures 17 and 18), and is also effective to initiate motor operation by suitable means (not shown) such as is disclosed in detail in the above mentioned copending Avery application.

The multiplier unit includes a bar 2030 (Figure 6) which is in a position to be engaged by the stem of any multiplier key 2022 of from "1" to "9" value inclusive, and is mounted for parallel movement by swinging levers 2044 pivotally connected to its opposite ends. A spring 2032 is tensioned between an extension of the forward lever 2044 and the machine framework (not shown), and urges these levers clockwise, thereby normally maintaining the bar 2030 in a raised position. The levers 2044 carry extensions 1900 between which is pivotally connected a stabilizer link 1901. This stabilizer link swings with the bar 2030 to prevent any play in the pivotal connection thereof which might result in other than perfect parallel movement upon depression of the various multiplier keys which contact the bar 2030 at spaced points throughout its length.

The mechanism for causing engagement of the setting clutch, upon depression of any multiplier key from "1" to "9," includes a link 2033 (Figures 6 and 12) which is pivoted at its right hand end to an ear of the bar 2030, and is supported adjacent its left hand end by a link 1907 depending from a lever 2034, included in a lever system which comprises levers 2034, 2035, and 2036. The levers 2034 and 2035, as shown in detail in Figures 11 and 12, are pivotally mounted upon a common pin 2037 supported by the depending portion of the key frame. The lever 2036 is pivoted at 1906 to the lever 2035. Levers 2034 and 2035 include, respectively, projections 2038 and 2039 between which a spring 2040 is compressed to urge the levers apart. Similarly, lever 2036 includes a projection 2041, while 2035 includes a projection 2042 between which projections a spring 2043 is compressed. A lug 2045 on lever 2035 limits the movement of lever 2036 and a lug 2116 on lever 2035 limits the movement of lever 2035 with respect thereto. Lever 2035 also includes an ear 2046 which rides beneath the bar 2030 and which is forced downwardly when the bar 2030 is depressed upon operation of a multiplier key. Depression of the "0" multiplier key (Figures 6, 14, and 15) also rocks lever 2035 downwardly by means of a lever 2090 which underlies the zero key stem, being pivoted at 2091, and carries a pin 2093 overlying the left end of the lever 2035.

Operation of the setting clutch 430 is placed under joint control of the bar 2030 and the mechanism for latching a multiplier key in depressed position. To this end, the setting clutch is engaged by lowering one end of the link 2033 by means of the bar 2030, and the other end of this link by the key latching mechanism to be described presently. The link 2033 underlies an ear 2048 formed on one arm of a lever 2047 which is pivoted at 1909 and urged counter-clockwise about its pivot by a tension spring 1956. The lever 2047 has a rearwardly extending arm 1950 provided with a slot 1951 which embraces a pin carried by a floating interponent 1952 supported at one end thereof by a link 1953 which is freely pivoted on a stud 1945 supported by the machine framework.

When the link 2033 is lowered to its full extent, it permits the lever 2047 to be pulled counter-clockwise by its spring 1956, raising the interponent 1952 to a position wherein it may be engaged by a ratchet wheel 1957 (Figures 6 and 18) which is continuously driven by the motor 640 whenever the motor circuit is closed.

The ratchet 1957 will thereupon kick the interponent 1952 sharply to the left (as viewed in Figure 6), so that its opposite end strikes a stud 1958 on a lever 1959. The lever 1959 is keyed to a shaft 501 to which the setting clutch dog 394 (Figure 17) is also keyed, so that such rocking of this lever will free the dog from the setting clutch and automatically cause engagement thereof.

Upon depression of the parallel bar 2030 by any of the multiplier keys "1" to "9", the lever 2035 having an ear 2046 (Figures 6 and 11) underlying bar 2030 is also rocked by this movement and compression spring 2040 rocking lever 2034 slightly and causing the lug 2062 to engage a notch 2092 in a key latching bar 2055 slidably mounted on the under surface of the key frame 1877 to move the bar to the left until a slot formed thereon and embracing the key being depressed abuts a lug 2015 (Figure 8) formed on the moving key stem, arresting further movement of lever 2034 and causing spring 2040 to be further compressed. This movement is sufficient to carry a notch 2057 out of the path of lug 2061. As the lug 2015 of the key being depressed is moved below the latch bar 2055, spring 2040 is permitted to expand, rocking lever 2034 to simultaneously bring the latch bar over the lug 2015 and lower the left end of link 2033 which is connected thereto by link 1907. Both ends of the link 2033 now being lowered, lever 2047 may be rocked sufficiently by its spring 1956 to cause engagement of the setting clutch. The latch bar 2055 holds the depressed key down and all the other keys up until it is retracted to the right, as viewed in Figures 6 and 8.

In order to effect the release of the locked multiplier keys it is necessary to provide means which will be operated upon operation of either the setting clutch shaft 431 or the carriage shifting mechanism (Figure 22) to retract the latch bar 2055. In view of the fact that the operator may depress a second key before the machine has completed the operation initiated by the first key depressed, and may be pressing down on a third key before the second is released, special adaptation of the latch bar operating means to the peculiar requirements of such operation is necessary.

Figure 6:
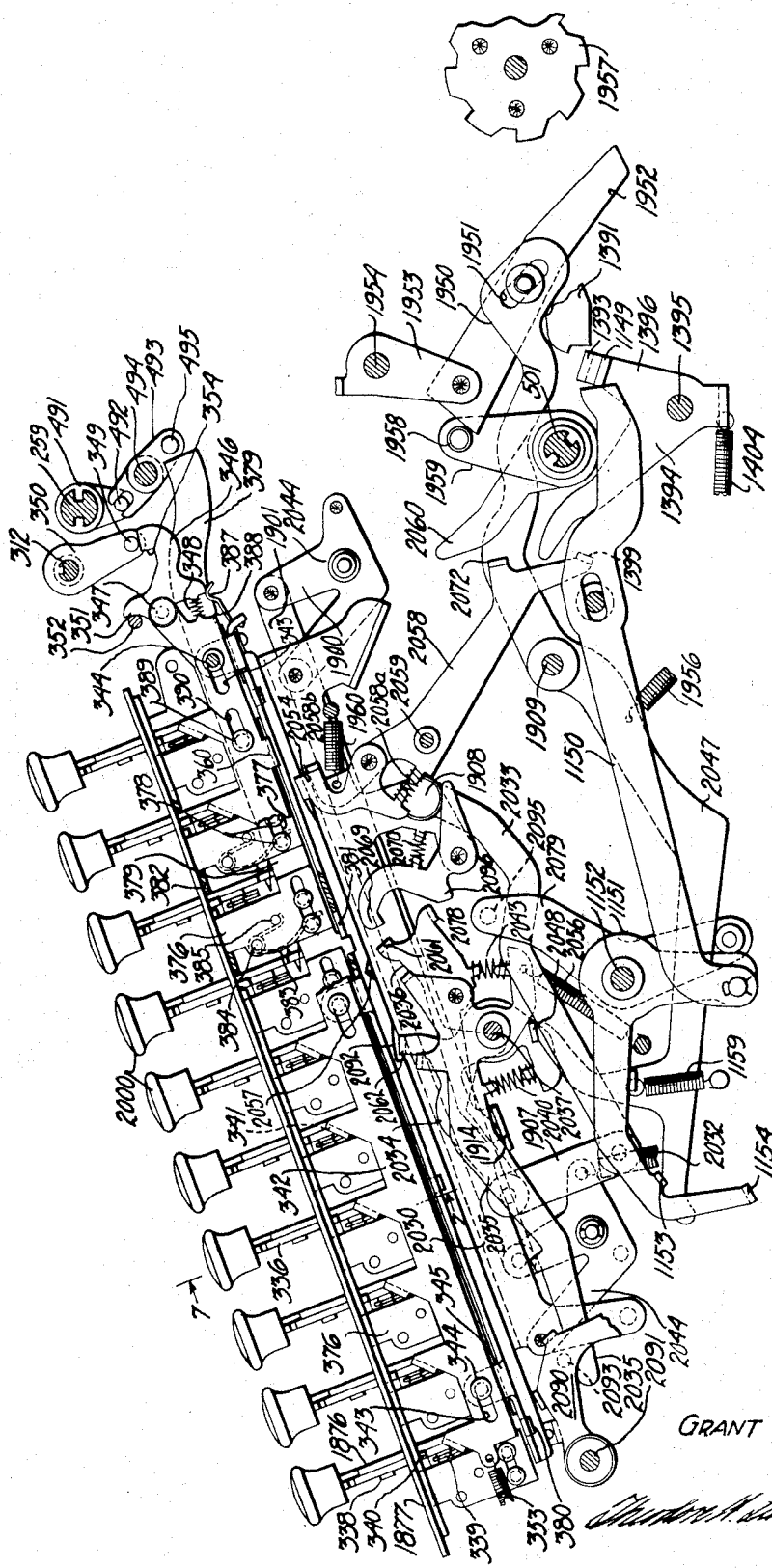
Figure 6 is a longitudinal sectional view, taken from the right side of the machine, illustrating the multiplier unit and multiplier decimal control mechanism.

Retraction of the bar 2055 to unlock the keys is effected by a lever 2058 (Figure 6) pivotally mounted at 2059 and adapted to receive a clockwise oscillation upon operation of either the setting clutch or the carriage shifting mechanism. As the setting clutch shaft 431 (Figure 17) receives a half rotation at the commencement of the multiplication operation, a cam 747 fixed thereon rocks the cam follower 746 journaled for rocking movement on shaft 501, and to which is fixed an arm 2060 (Figure 6). Thus ear 2060 engages an ear 2072 on the lever 2058 to rock the same. During each carriage shifting operation, as will hereinafter appear, a lever 1396 (Figure 6) receives a counter-clockwise oscillation and this lever is provided with an arm 1394 adapted to engage a second ear 1399 on lever 2058.

Adjacent the upper end of lever 2058 there is pivoted thereto an extension 2054 having a laterally formed portion engaging a notch in the latch bar 2055. A spring 2058a, compressed between the lever 2058 and the extension 2054, normally holds the extension against the stop 2058b formed on the lever so that the lever and its extension ordinarily function as a unit. However, if lever 2058 receives an excessive stroke the forward end of the slot in latch bar 2055 will be brought against the key stem and spring 2058a will then yield. A spring 1960 normally urges the lever 2058 clockwise and prevents the latch bar 2055 from drifting into latching position.

Means are also provided for preventing the locking of a key in depressed position in the event it is held down until after the releasing mechanism as described above has functioned. Lever 2036 (Figures 6 and 11) pivoted to lever 2035 at 1906 is provided with an ear 2061 adapted to engage in a notch 2057 in bar 2055 as the latter is moved to the right by lever 2058, and to restrain the bar from returning to key latching position so long as the key is held depressed. It will be recalled that lever 2035 is rocked counter-clockwise about its pivot 2037 by downward movement of the parallel bar 2030 and this movement thereof is transmitted through spring 2043 to lever 2036.

It will be observed that should the operator be pressing down upon a locked up multiplier key 2002, it would depress during the instant when notch 2057 is being moved the slight extra distance to the right which is necessary to insure engagement thereof by ear 2061. To prevent ear 2061 from engaging in notch 2057 so as to prevent the functioning of the bar 2055, a pawl 2069 (Figure 6) is pivoted on a depending portion of the parallel bar 2030 and the tail of the pawl is pressed against the pivot head 1908 by a spring 2070 compressed between the pawl and the depending portion of the parallel bar.

Pawl 2069 moves slightly upwardly and then downwardly with the parallel bar 2030 and engages an ear 2078 on lever 2036 to rock this lever about its pivot on lever 2035, compressing the spring 2043 and preventing engagement of ear 2061 in the notch 2057 of the lock bar 2055. Thus, the lock bar is therefore free to move leftwardly (as viewed in Figure 6) to lock the key in depressed position.

The pawl 2069 must release lever 2036 before the next operation of the key release lever 2058, however, in order to insure against rocking of the same key in the event it is held down by the operator, this releasing action being effected by a lever 2079 (Figure 6) rockably mounted on a shaft 1152 and provided adjacent its upper end with a pin 2095 adapted to engage the edges of a pointed extension 2096 on pawl 2069 or to rock said pawl and release lever 2036 therefrom.

Lever 2079 (see Figure 14 also) is operated by the carriage dipping mechanism through link 2097 pivoted to the lower end of lever 2079 and connected to a link 1713 (Figures 14 and 19) through a supporting arm 2098 pivotally mounted on the frame.

Referring to Figure 19 it will be seen that link 1713 is pivoted at 598 to an arm 1714 pinned to the shaft 600 to which there is likewise pinned the cam follower arm 597. The setting clutch 431, through the cams 574, effects a release of the lever 2036 from pawl 2069 before the retraction of the lock bar 2055 which is effected by the cam 747 (Figure 17). The ear 2061 of lever 2036 will therefore be free to restrain a return of the lock bar 2055 during a setting clutch operation initiated by a key, the release of which it is desired to insure. When a key is being pressed down by the operator during a setting clutch cycle initiated by another key, it is not free to go down until after the rocking of pawl release lever 2079 by the carriage dip cam 596 and slightly before the completion of the retraction of lock bar 2055 by the main clutch opening cam. Lever 2036 will therefore be restrained by pawl 2069 so that lock bar 2055 may be moved to the left and lock the key in depressed position.

After the main clutch dog 395 has been rocked to cause engagement of the main clutch 428, it is maintained in rocked position by a latch 632 (Figure 17) which is rockably supported by a shaft 626 and urged in a clockwise direction by a spring 633. A roller 634 is mounted on the upper end of the latch 632 and engages the leftmost extension of the clutch dog 395 and, upon clockwise rocking of the dog 395, the roller 634 is rocked under the dog to maintain the same in rocked position against the action of the spring 612.

To stop the machine after a predetermined number of multicyclic operations have occurred, the cams 2021, 2023, and 2024, and the bell crank 2022 (Figure 9) are employed. As appears in Figure 9, the right hand face of cam 2021 has a lateral cam face 2070 so that at the beginning of a clockwise or counter-clockwise rotation of cam 2021, the tip 2071 of the universally pivoted bell crank 2022 is moved aside and slides along the outside face of the cam until the high point thereof has been passed and the bell crank is moved back into cooperative relation with the peripheral face of the cam by spring 2022 which includes a pin 2123 therein to act as a guide for the spring and to centralizer lever 2022. As the cam approaches the end of its rotation, the bell crank is rocked in a counter-clockwise direction. This rocks lever 2072 clockwise about its pivot and rocks lever 2117 counter-clockwise. Lever 2117 is pinned to shaft 626 which, as appears in Figure 17, is the same shaft to which the main clutch dog latching member 632 is pinned; thus, this counter-clockwise movement of lever 2117 also rocks the latch 632 in a counter-clockwise direction to release the main clutch dog 395.

The inside face of the cam 2023 (Figure 9) is provided with similar cam faces so that a roller 2077 carried on bell crank 2022 first rides about the outside face of that cam and then onto the peripheral surface of the cam to ride over the high point thereof.

When a "2" selection is made the cam 2024 is rotated by gear 2020, the cam follower 2022 follows the periphery of the triangular-shaped cam 2024 under the pull of the spring 2122, and rocks lever 2072, 2117, and shaft 626 upon riding over the high point of the cam 2024.

Backlash in the gear train driving gear 2024 ordinarily insures such tripoff during the second cycle, but a lost-motion connection between the cam 2024 and its gear 2020 is shown at 2024a (Figure 10) to insure the same.

To effect an automatic shift of the carriage 250 toward the left after each multiplication operation, the following mechanism is provided. Referring to Figure 19, the cam follower lever 570 illustrated in that figure, has an extension 1385 carried thereby with an ear 1386 extending therefrom. This ear 1386 is normally adapted to overlie a shoulder 1390 formed on a floating lever 1377 which is pivoted at 1379 (Figure 15) to the shift operating lever 1380. Lever 1377 is weighted at its leftmost end (as viewed in Figure 15) to cause the shoulder 1390 formed thereon to bear upwardly against the ear 1386.

When the setting shaft 431 is rotated at the beginning of a multiplication operation to mesh the accumulator register gears with the gears 189, the lever 570 is rocked clockwise causing the ear 1386 to move to the right past the shoulder 1390 and enable the lever 1377 to rock into a position wherein the shoulder 1390 is aligned with the left edge of the ear 1386.

Near the completion of a multiplication operation, and upon raising of the links 566 by the springs 569 (Figure 19), under the control of the restore cam 596, the ear 1386 on the extension 1385 of lever 570 engages the shoulder 1390 on the lever 1377 and thereby causes this lever to rock the lever 1380 in a counter-clockwise direction. A dog 1383 is pivoted to the upper end of the lever 1380 and has a pair of oppositely disposed shoulders formed on the rightmost end thereof, as viewed in Figure 14.

In the machine embodying the present invention, the dog 1383 is preferably held at all times in the position illustrated in Figure 14 by a lever, a part of which is shown at 1214, wherein the upper shoulder of the dog is in a position to engage an ear 1384 formed on the link 1374 (Figure 21). Therefore, upon rocking of lever 1380, the dog 1383 will engage and shift the link 1379 to the left and thereby effect a leftward shift of the carriage 250.

To insure that the shift is limited to a single step, the lever 1377 is rocked clockwise near the completion of the shifting movement. A lever 1387 (Figure 15) is pivoted at 1388 and has a lug 1389 thereon underlying the leftmost end of the link 1377. The lowermost end of the lever 1387 is adapted to be engaged by a cam disc 1367 having a pair of diametrically opposed lobes formed thereon, and rotatably mounted on the hereinbefore mentioned sleeve 1371 provided on the shaft 1331. The disc 1367 has a pin 1368 extending therefrom and riding in an extended notch formed in the disc 1366 which is keyed to the shaft 1331.

In order to secure the same cyclic time of operation of the lever 1387 in the event that the carriage shifting mechanism is adjusted to effect a rightward, instead of the preferred leftward movement of the carriage, the notch formed in the disc 1366 extends almost half way around the disc 1366. Thus, near the completion of the initiated carriage shift, regardless of the direction of rotation of the shaft 1331, one of the lobes on the disc 1367 will engage and rock the lever 1387 to remove the lever 1377 from the restraint of the ear 1386 on the lever 570, and thus allow the centralizer 1403 to move the shift controlling mechanism into neutral position.

Depression of the zero multiplier key is effective to rock member 2090 (Figure 6) secured to shaft 2091 to initiate operation of the shift mechanism in a manner to be presently described. While this movement also depresses lever 2035 and thereby causes movement of link 2033 to some extent, the operating parallel bar 2030 is not depressed and the link 2033 is not moved to the extent necessary to cause operation of the setting clutch. Movement of lever 2035, however, brings extension 2062 into notch 2092 in the key latching bar 2055 to move the bar and thereby lock the remainder of the multiplier keys when the zero key is depressed.

The lever 2090 is rocked downwardly by depression of the zero multiplier key against the action of a spring 1140 (Figure 14) and an extension 1142 thereon engages a pin 1143 at one end of a long link 1144 which is pivoted at its opposite end to a lever 1145. The lever 1145 is pinned to a shaft 1157 having also pinned thereto an arm 1158 which is connected by a pin and slot connection 1158' to the upper end of the lever 1380 which is pivoted on the shaft 1376. Therefore, upon depression of the zero key, the shaft 1157 will be rocked clockwise to cause the dog 1383 to shift the link 1374 to the left, as viewed in Figure 21, and thereby effect a leftward shift of the carriage 250.

Depression of the zero key is also effective to disable the multiplier keys. If the zero key were being held down until the latch bar 2055 returned to its latching position, it might be permanently latched down by engagement of the lug 2015 under the latch bar. In order to prevent this, lever 1146 (Figure 14) is pivotally supported on a frame stud 1149, and is provided with an ear at its right hand end to engage a notch 1147 in the lower edge of the latch bar 2055, under the action of a spring 1150 tensioned between the lever 1147 and a stud 1150' suitably supported by the machine framework. An ear 1148 on the lever 2090 normally holds the lever 1146 out of engagement with the latch bar, however, permitting it to come into engagement therewith only upon depression of the zero key which lowers the lever 2090. Thus, while the zero key is depressed, the lever 1146 engages with the notch 1147 to prevent the latch bar from moving to its latching position, and upon release of the zero key, lever 1146 is rocked in a clockwise direction to free the latch bar from this restraint.

If the zero key is depressed while the machine is running out a multiplication initiated by another multiplication key, however, it must be locked down until the carriage shift which it is to initiate has taken place. Link 2097 (Figure 14), which is displaced to the left by the dipping of the carriage, is adapted to engage an ear 2099 on latch lever 1146 to prevent the latch from engaging in notch 1147 under these circumstances, and the lock bar 2055 may therefore lock the zero key down until it is retracted as an incident to the carriage shifting operation, upon rocking of lever 2058 by arm 1394 of member 1396 (see Figure 6). This takes place at the very end of the shift operation following a multiplication so that a second shift will follow if a zero key has been latched down.

To insure that such a carriage shift operation initiated by the zero key is limited to a single step, the link 1144 is raised to remove its pin 1143 from engagement with the extension 1142 of the lever 2090, thereby letting the shift mechanism return to its neutral position. This is accomplished by a lever 1355 (Figure 15) which is urged into engagement with the pair of diametrically opposed rollers 1363 mounted on the disc 1362 (Figure 21) secured to the shift jack shaft 1331. Lever 1355 is pivoted at 1351 and is pivotally connected to a link member 1391 normally maintained in a position to strike an ear 1149 of lever 1396 (Figure 6).

Therefore, at about the middle of a shift cycle, the lever 1396 will be rocked in a counter-clockwise direction, causing the ear 1149 to engage the right hand of a floating link 1150 to move this link to the left and rock the lever 1151 which is pivotally supported on a shaft 1152. The lever 1151 is urged counter-clockwise by a spring 1159 and has a downwardly depending arm pivoted to the floating link 1150 so that its rocking thereby will be in a clockwise direction.

An ear 1153 adjacent the left hand end of the lever 1151 (see also Figure 14) underlies the link 1144 to engage the same and lift it to a position wherein its pin 1143 will override the extension 1142 as stated above.

Referring to Figure 15, a lever 1392 pivoted on a shaft 225 is urged against an ear 1377' formed on the floating lever 1377 by a spring 1382 tensioned between the lever 1392 and a piece 553. A link 1403 is pivotally connected to the lever 1392 and slidably supports the hereinbefore mentioned link 1391 so that when the floating lever 1377 is in the position illustrated in Figure 15, with the shoulder 1390 thereon underlying the ear 1386 on the lever 570 (Figure 19), the link 1391 will be in a position to strike the ear 1393 of the lever 1396 (Figure 6).

Since the zero multiplier key does not initiate a main clutch cycle, the carriage plates 266 (Figure 19) are not dipped, and consequently, the ear 1386 is not moved rearwardly to enable the lever 1377 to rock counter-clockwise to position its shoulder 1390 in front of the ear 1386. Accordingly, the lever 1392 is held to position the link 1391 so that it will engage and rock the lever 1396 during the ensuing half cycle of the shifting mechanism. However, whenever the carriage is dipped to remove the ear 1386 from a position overlying the shoulder 1390 of the lever 1377, the lever 1377 will rock upwardly to enable the lever 1392 to be rocked clockwise by the spring 1382 to remove the link 1391 from the position wherein it is adapted to strike the ear 1393 of the lever 1396.

If the zero key is depressed while the machine is running out a calculation initiated by previous depression of a multiplier key, the shifting operation must be delayed until the completion of the previously initiated operation. In other words, digitation must be followed first by an automatically initiated one-step shift, and then by another one-step shift initiated by the zero key. In this initiation the mechanism operates as follows.

Assume that a "9" multiplier key has been depressed. As the carriage rises at the conclusion of the ensuing multiplication operation, the shift mechanism is automatically set into operation as hereinbefore described, by the impingement of the ear 1386 (Figure 19) with the shoulder 1390 of the lever 1377. As this operation is initiated, member 1380 is rocked moving link 1144 (Figure 14) to the left and permitting pin 1413 thereon to move off of the top of extension 1142 to a position adjacent the left end thereof. It being assumed that the zero multiplier key is locked down, the extension 1142 will prevent link 1144 from returning to the right when, during the first step of carriage shifting the shoulder 1390 (Figure 15) is released from ear 1386 by the rocking of lever 1387, and a second carriage shifting step will therefore ensue.

The zero multiplier key is not released during the first step of carriage shifting because, at the time when lever 1355 (Figure 15) is rocked, shoulder 1390 of link 1377 is in contact with the ear 1386 and the lever 1392 is therefore rocked sufficiently clockwise to raise the member 1391 to a position wherein it will overshoot lever 1396 (Figure 6) and the key release lever 2058 will not be moved by the lever 1396 to shift the lock bar 2055.

During the second step of carriage shifting, however, the parts are in a position shown in Figure 15, so that when the member 1355 is rocked, the link 1391 will engage the ear 1393 of lever 1396 to rock this lever and release the zero multiplier key.

*Accumulator and counter decimal displaying mechanism*

Means controlled cooperatively by the hereinbefore mentioned multiplicand decimal setting mechanism and the hereinafter described multiplier decimal setting mechanism are provided to automatically display the decimal point of a product appearing in the product or accumulator register, as well as to display the decimal point of the multiplier appearing in the counter register.

The product decimal indicator mechanism comprises a shaft 300 (Figure 5) slidably keyed in bearings formed in end plates 302 of the carriage 250 directly below a plurality of decimal sight openings 301 formed in the carriage cover plate. Each of the sight openings 301 is situated midway between two adjacent accumulator dial sight openings 418. The shaft 300 is normally maintained in its rightmost position by means of a compression spring 294 interposed between the rightmost supporting plate 255 of the carriage 250, and a collar 298 suitably secured to the shaft 300, and has a plurality of sleeves 303 thereon, one adjacent each of the sight openings 301. The sleeves 303 are slidably keyed on shaft 300 and each has the rightmost half thereof painted in a color blending with the color of the carriage cover, while the leftmost half thereof is colored in a contrasting color.

Normally the various sleeves 303 are positioned in a manner to be described hereinafter, in their leftmost position relative to the carriage cover wherein the rightmost half thereof is visible through the sight openings 301. However, any of the sleeves may be shifted to the right, relative to the carriage, to display its contrastingly colored left half through the corresponding sight opening and thus indicate a decimal point, and means are provided to yieldably hold each sleeve in either of its two different positions.

Referring to Figure 4 each sleeve 303 has a pair of spaced detent notches 304 formed on the under side thereof and adapted to be engaged by a ball 305 movable in an aperture formed in a camming plate 307, which plate 307 has a plurality of notches (Figure 3) formed therein interlocking with corresponding notches formed in the various supporting plates 255 of the carriage 250. A leaf spring 306 is suitably secured to the under surface of the camming plate 307 to urge the balls 305 into engagement with either of the detents 304 formed on the sleeves 303.

Each of the hereinbefore mentioned keyboard decimal markers 113 (Figure 5) terminates in an offset or cranked end 309 which extends into a groove formed in each of a series of decimal setting slides 311 (see also Figure 2). One of these slides 311 is provided for each marker 113, and all are splined on a shaft 312 which is suitably journaled for rocking movement in bearings formed in plates 313 secured to the under surface of the stationary cover 147. Each slide 311 has a nose 314 extending upwardly therefrom and adapted to engage ears 308 formed on extensions of the sleeves 303 under certain conditions, as will presently appear.

The shaft 312 is normally held in the position in which it is illustrated in Figure 2, wherein all of the noses 314 of slides 311 are maintained out of the path of movement (during carriage shifting) of the various ears 308 on the sleeve 303. However, as will be described hereinafter, upon setting of a multiplier decimal indicator, the shaft 312 will be rocked clockwise a small amount to move the noses 314 into the path of movement of the ears 308.

Figure 5:
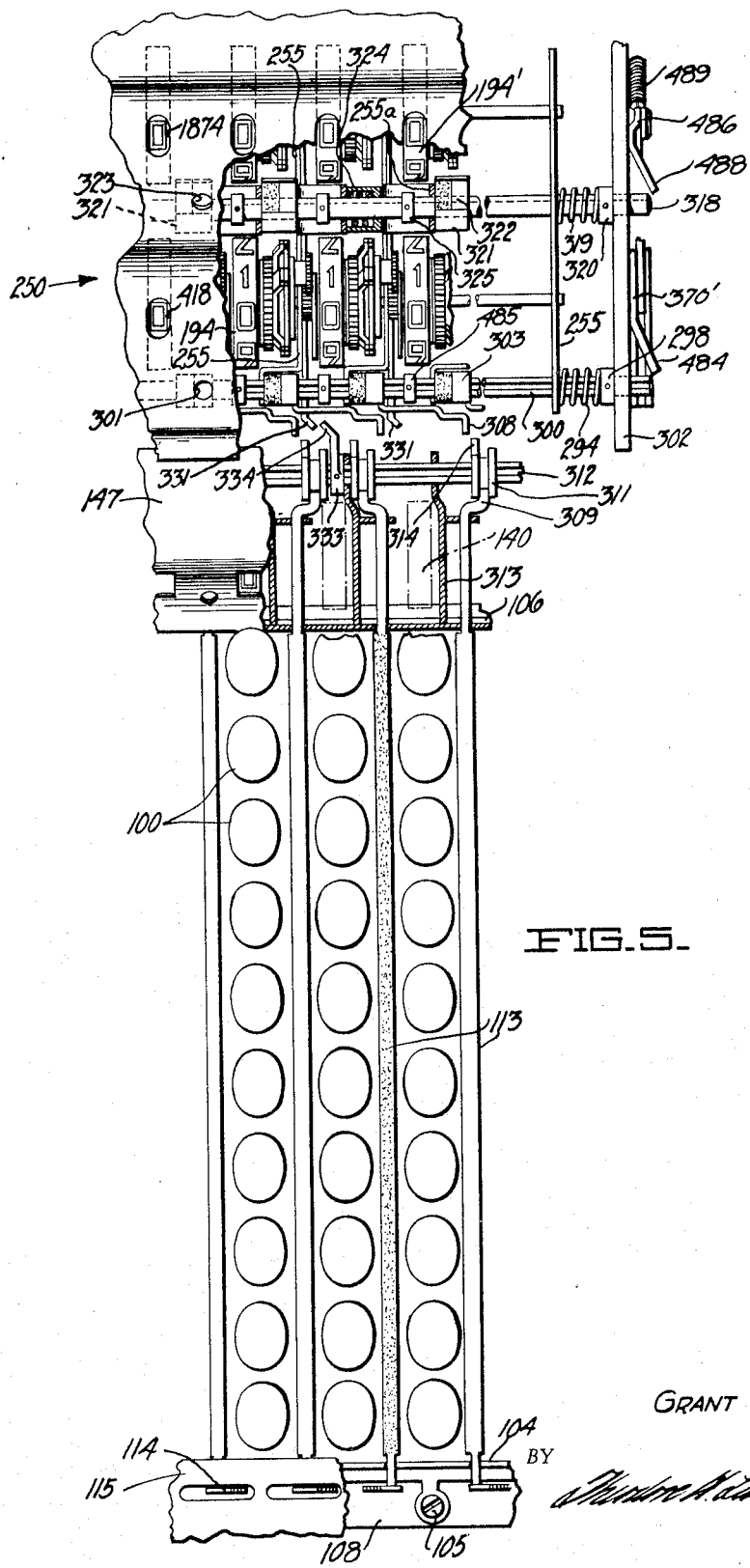
Figure 5 is a developed plan view, partly in section, and with parts broken away, of the calculating machine.

It will be noted on reference to Figure 5, that any markers 113 which have been rocked to display a multiplier decimal place, such as the second marker from the right, will have shifted its slide 311 to the left of, and somewhat spaced from, the corresponding ear 308 of the next sleeve 303 to the left of the rocked marker 113. All of the other markers 113 will position their slides 311 slightly to the right of the corresponding ears. Thus, when one of the slides 311 is positioned to the left of the ear 308 of the corresponding sleeve 303 (depending on the position of the carriage at that time), and the shaft 312 is rocked clockwise upon a setting of the multiplier decimal, subsequent automatic shifting of the carriage 250 to the left, as was described hereinbefore, will enable the nose 314 of the active slide 311 to engage the corresponding ear 308 and hold its sleeve 303 from leftward movement along with the carriage. This sleeve 303 thus assumes its rightmost position relative to the carriage, wherein it displays an indication of the decimal point. Thereafter, and before the one-step shift of the carriage has been completed, camming projections 316 (Figures 2 and 3) formed on the camming plate 307 will engage the noses 314 and thereby cam the same and the shaft 312 back to their initial positions indicated in Figure 2. Therefore, the noses 314 on all of the inactive orders will be rocked clear of ears 308 before the carriage has moved far enough laterally to bring them into contact with the ears 308 of the corresponding sleeves 303.

The decimal point of the multiplier displayed on the counter register 1874 is also automatically indicated by the mechanism of the present invention and, for this purpose, a shaft 318 (Figures 2 and 5) is slidably keyed in bearings formed in the end plates 302 and in offset lugs 255a of the supporting plates 255 of the carriage. A compression spring 319 is interposed between the rightmost supporting plate 255 and a collar 320 pinned to the shaft 318 to normally maintain this shaft in its rightmost position.

A plurality of sleeves 321 are slidably keyed to the shaft 318 and have indicators 322 thereon, each of which has the rightmost half thereof painted in a color intended to blend with the color of the carriage cover plate, while the leftmost half thereof is painted in a color contrasting to that of the carriage plate. Each sleeve 321 has a compression spring 324 mounted in a well formed therein, and interposed between the adjacent lug 255a of a supporting plate 255, and the end of the well formed in the sleeve, to urge the sleeve toward the right against a collar 325, in which position the left half of the respective indicator 322 would be aligned with a decimal sight opening 323, situated midway between each counter dial sight opening 1874 to indicate a decimal point. However, each sleeve 321 is normally restrained against such rightward movement by a rod 326 which normally engages the rightmost end of the respective sleeve 321 to hold it in the position illustrated in Figure 5. Each rod 326 is slidably mounted in a bearing formed in a lug 327 suitably secured to an adjacent supporting plate 255, and is pivotally connected at the lowermost end thereof to a bell crank 328 pivoted on a rod 329 which is suitably supported by the various plates 255. A second rod 330 is also pivotally connected to each bell crank 328 and is slidably mounted in a bearing formed in a lug 332 also supported by an adjacent plate 255.

A single arm 333 (Figures 2 and 5) having a camming nose 334 thereon, is pinned to the shaft 312 substantially in alignment with the keyboard order located adjacent the rightmost keyboard order of the machine and, upon rocking of the shaft 312 to its clockwise position, the camming nose 334 will, upon leftward movement of the carriage, engage a deflecting portion 331 formed on the rod 330 of the next carriage order to the right, to cam the rod 330 to the right, as viewed in Figure 2, and thus rock the bellcrank 328 to retract the upper end of rod 326 from restraining engagement with the corresponding sleeve 321 against the action of a tension spring 490 extending between the bell crank 328 and a pin secured to an adjacent supporting plate. The respective compression spring 324 will then become effective to shift the sleeve 321 to the right and enable the indicator 322 to display an indication of the decimal point of the multiplier, as registered in the counter register.

Decimal setting mechanism

The means for rocking the shaft 312 (Figure 2) to effect correct setting of the accumulator and counter decimal points during a multiplication calculation, comprises the decimal multiplier keys 2000 (Figures 1, 6, 7, and 8). Depression of any of these decimal keys causes a multiplication of a factor set up on the keyboard by the number indicated on the depressed decimal multiplier key, in the same manner as do keys 2002, and also controls rocking of the shaft 312 to correctly indicate the product and multiplier decimal points on the corresponding registers.

For example, in multiplying a certain multiplicand factor by the multiplier "37.52", the operator would successively depress first the "3" and the "7" multiplier keys 2002, and thereafter he would depress the ".5" decimal multiplier key 2000, depression of the latter key controlling the indication of the decimal point in the product and multiplier registers. He may thereafter depress either the "2" or ".2" key 2002 or 2000 to effect multiplication by the last factor of the multiplier, as will appear presently.

Referring in particular to Figure 7, the decimal multiplier keys 2000 are located in juxtaposition with the corresponding multiplier keys 2002 and the key stems 336 thereof are provided with inclined slots 337 guided by pins 338 extending from the key stem 1876 of the adjacent multiplier key. A spring 339 is interposed between the lowermost pin 338 on each multiplier key stem 1876 and a lug 340 formed on the corresponding decimal multiplier key stem 336 to normally maintain the key 2000 in the position shown in Figure 7. Therefore, when a multiplier key 2002 is depressed against the action of compression spring 1878 to effect a multiplication, the corresponding key 2000 is pressed downwardly but is not moved transversely. However, when a key 2000 is depressed, the spring 339 being weaker than the spring 1878, is compressed first and the key stem 336 moves transversely, guided by the pins 338, to the position illustrated by the dot and dash lines in Figure 7, wherein the pins 338 engage the upper ends of the slots 337. Further depression of key 2000 effects depression of the key 2002 and its key stem 1876 to initiate a multiplication operation in the usual manner.

A projection 340 is formed on each key stem 336 and, upon depression of any key 2000, this projection is moved transversely to a position wherein continued depression of the key causes it to engage and cam an inclined ear 341 of a bar 342 (Figures 6, 7, and 15) rearwardly. The bar 342 has a series of elongated slots 343 which are guided over pins 344 extending from upwardly bent lugs 345 of the multiplier key frame 1877.

A live tip 346 (Figure 6) is pivoted to a rightward extension of the bar 342 by a pin 347 and is urged in a counterclockwise direction by a compression spring 348 disposed between the bar 342 and live tip 346, toward engagement with a pin 349 mounted on the lower end of an arm 350 which is suitably keyed to the hereinbefore mentioned decimal slide supporting shaft 312. When all of the decimal multiplier keys 2000 are out of camming relation with the bar 342, a tension spring 353 extending between the leftmost end of the bar 342 and a portion of the machine framework (not shown) holds the bar 342 in its leftmost position illustrated in Figure 6, wherein an arm 351 on the live tip 346 engages a stationary pin 352 to hold the live tip 346 against the action of the compression spring 348 and out of engagement with the pin 349. As the bar 342 is cammed rearwardly by depression of a key 2000 a shoulder 354 on the live tip 346 is moved to a position behind the pin 349 and the spring 348 becomes effective to raise this shoulder behind the pin.

Upon full downward depression of a key 2000, the projection 340 on the key stem 336 thereof passes beneath the corresponding ear 341 of the bar 342, enabling the spring 353 to retract the bar unless it is restrained by other means as will be presently described. During such retraction the live tip 346 will rock the arm 350 and shaft 312 clockwise to position the decimal setting slides 311 (Figure 5) in the path of movement of the ears 308 of sleeve 303 and to place the arm 333 in a position to cam one of the rods 330 (Figure 2) to effect display of a decimal point in the counter register. Toward the end of such retraction, the arm 351 of live tip 346 engages the pin 352 (Figure 6) to rock this member and thereby remove the shoulder 354 from engagement with the pin 349, permitting the shaft 312 to be later cammed back to its initial position during the carriage shift by the camming plate 307 as was described hereinbefore.

The pin 349 extends through the arm 350 and is engaged by a pawl 356 (Figure 8) pivoted to the multiplier key section frame 1877 by a pin 357 and urged upwardly by a spring 358 tensioned between the pawl and a pin 359 suitably secured to the machine framework. The pawl 356 has a pair of spaced notches thereon, either of which is adapted to engage the pin 349 to yieldably hold the arm 350 and shaft 312 in either of their two aforementioned positions.

Means are provided to prevent leftward movement of the bar 342 (Figures 6 and 15) to rock the shaft 312 into active position upon depression of one of the decimal multiplier keys 2000 until the key locking bar 2055 has been moved to the right, as described in the previous section, to release the depressed multiplier key 2002. This arrangement is necessary in the machine described in order to insure that the shaft 312 will not be rocked into its clockwise position immediately upon depression of a decimal multiplier key 2000 and while the machine is still running out a multiplication operation initiated by a multiplier key 2002.

On the under edge of the bar 342 is a lug 360 (Figure 15) which is adapted to be engaged by an ear 361 formed on an arm 362 which is pivotally supported by the rearmost pin 344, which pin is mounted in an upwardly extending lug 345 on the multiplier key section frame 1877. A compression spring 366 is interposed between a depending ear 364 on the arm 362 and a lug 365 depending from the key section frame 1877 to urge the arm 362 in a clockwise direction and therefore engage the ear 361 with the leftmost edge of the lug 360 on bar 342, when this bar 342 is cammed rearward by depression of a key 2000. The bar 342 will therefore be allowed to move leftwardly only a small amount until such time as the lock bar 2055 is moved rightwardly by the lever 2058 (Figure 6). At this time, the bar 2055 engages the ear 364, rocking the arm 362 counterclockwise, (Figure 15) and releases bar 342 for leftward movement by the spring 353 (Figure 6).

In the event that the zero decimal multiplier key 2000 is depressed while the machine is running out a multiplication operation, the shaft 312 must not be rocked until the multiplication is completed and the automatic shift following such multiplication, at least, is initiated. At the same time, the shaft 312 must be rocked clockwise into active position before the shift initiated by the zero key has progressed an appreciable amount, and since the bar 2055 is not moved to the right to release the zero multiplier key early enough in the course of the shifting operation initiated by this key, it is necessary to provide supplementary means which will release the bar 342 from latch 362 earlier in the shift. To accomplish this correct timing of the operation of the shaft 312, the retraction of bar 342 toward the left, as viewed in Figures 6 and 15, by the spring 353, is controlled jointly by the zero multiplier key and by the zero multiplier key release conditioning mechanism.

A link 367 (Figure 15) is pivoted by means of a pin 368 to the link 1403 which, it will be recalled, is controlled by the lever 1392 and floating link 1377 to place the link 1391 in position to rock the lever 1396 (see also Figure 6) after an automatic shift is substantially completed, so that the subsequent operation of the shifting mechanism will release the zero multiplier key. The other end of the link 367 has an elongated slot 369 formed therein which embraces a pin 370 mounted on the hereinbefore mentioned lever 2090 which is rocked downwardly by depression of the zero multiplier key or the zero decimal multiplier key to institute a one-step shift of the carriage, or cause a second shift to ensue if the key is depressed during operation initiated by another key. A pin 372 is mounted on the link 367 near the right hand thereof, as viewed in Figure 15, and is embraced by an elongated slot 373 formed in a second link 374, which is pivoted at the upper end thereof to the arm 362 by a pin 375.

Ordinarily, when a decimal multiplier key other than the zero decimal multiplier key is depressed, the elongated slot 373 on link 374 will enable the arm 362 to be rocked by the lock bar 2055 to release the bar 342 without lowering the link 367. However, if during a multiplication operation initiated by one of the keys 2002 the zero decimal multiplier key (Figure 15) is depressed, the lever 2090 will rock the left end of the link 367 downward, but at this time the ear 1388 (Figures 15 and 19) will be in engagement with the rightmost edge of the shoulder 1390 of the floating lever 1377 to allow the spring 1382 to hold the link 1403, and consequently the right hand end of the link 367 upwardly in a position wherein the pin 372 on link 367 is ineffective to hold the link 374 downward, and the ear 361 of arm 362 will remain in latching engagement with the lug 360 on the arm 342.

As the automatically initiated carriage shift following the multiplication is substantially completed, and the second shift caused by depression of the zero multiplier key commences, one of the lobes on the cam disc 1367 engages and rocks the lever 1387 to cause the lug 1389 thereon to rock the floating lever 1377 clockwise, causing the lever 1392 to lower the link 1403 and, consequently, the right hand end of the link 367. Therefore, the link 374 will be pulled downwardly to disengage the ear 361 on arm 362 from the lug 360 and enable the bar 342 to rock the shaft 312 (Figures 2 and 6) clockwise into active position in time to effect setting of the decimal indicators during the shift caused by depression of the zero multiplier key.

Means are provided to prevent a second camming movement to be applied to the bar 342 by a decimal multiplier key 2000 after the bar has already been so cammed during any one multiplication operation. To this end a plurality of interlock members 376 (Figures 6 and 7) are provided, one being positioned adjacent each decimal multiplier key. Each interlock member 376 is formed with an elongated slot 377 at the lower end thereof, which embraces a pair of shoulder studs 378 mounted on an interlock bar 379. A number of lugs 380 depend from the bar 379 and are slidable along slots 381 formed in the lower flange of the multiplier key section frame 1877 to guide the bar 379 in an endwise direction. The upper ends of the interlock members 376 are guided in slots formed in a guide strip 382 suitably secured to the under surface of the upper flange of the frame 1877. Each of the members 376 is urged into a rightward position, as viewed in Figure 6, relative to the bar 379 by a spring 383 which is wrapped around a stud 389 extending from the member 376 and has its ends interposed between a pin 385 on the member 376 and one of the pins 378 carried by the bar 379.

A shoulder stud 389 is mounted on the bar 379 and extends through an elongated slot 390 formed in the bar 342. When the bar 342 is cammed rightwardly by depression of one of the decimal multiplier keys 2000, the stud 389 is engaged by the end of slot 390 to also draw the bar 379 rightward from the position illustrated in Figure 6, to a position wherein all of the interlocks 376, except that adjacent the depressed decimal multiplier key, will be positioned at the right ends (as viewed in Figure 7) of the projections 340 of the decimal multiplier key stems 336.

A spring 387 (Figure 6) is mounted on the rearward end of the multiplier key section frame 1877, and is adapted to engage either of two spaced detents 388 formed in the bar 379 to hold the bar in either of its two adjusted positions.

As the interlock bar 379 is moved to the right by the bar 342, upon depression of a decimal multiplier key 2000, the interlock member 376 adjacent the key being depressed will strike the leftward face of the projection 340 of that key (as viewed in Figure 6) and will thus force the respective spring 383 to yield. When the depressed multiplier key is allowed to be retracted by its spring 339 (Figure 7) the interlock member 376 will be snapped into interlocking position by the spring 383. During the remainder of the multiplication the bar 379 will be held rearward by the spring 387, and the various interlock members 376 will prevent any of the decimal multiplier keys 2000 from again camming the bar 342 rearward. However, the keys 2000 will still be permitted to be depressed, but during such movement the outer faces of the projections 340 (Figure 7) will merely slide along the adjacent surfaces of the interlock members 376, and will thus only cause depression of the corresponding multiplier keys 2002. The bar 379 is restored to its leftward position when the decimal indicators are cleared, as hereinafter described.

Although in most instances it is only necessary to set up a single decimal point in the result of a multiplication appearing in the product register, the machine of the present invention is capable of concomitantly setting off two or more decimal points in the product register to accommodate for certain types of calculations in which such multiple setting of the decimal point is desirable. One type of problem, commonly encountered, in which it may be desirable to automatically set off more than one decimal point at a time in the product register is in computing inventories, et cetera, wherein two different multiplicands, i. e., cost price and selling price of an article, are simultaneously multiplied by the same multiplier, i. e., quantity of articles on hand. In this case, the "cost price" would be set up, for instance, in the left hand side of the keyboard and the "selling price" would be set up in the right hand side, while the appropriate decimal point markers 113 for each of these two factors would be overturned in the usual manner. The "quantity" which may include fractional amounts, is then set up in the multiplier keys 2002 and the multiplier decimal point is set as usual by depressing the appropriate multiplier decimal key 2000, the total "cost price" appearing in the left hand side of the product register and the total "selling price" appearing in the right hand side of the register. The decimal point of the two results will, of course, be properly set off by two of the product decimal indicating sleeves 303 in the manner described hereinabove.

*Clearing mechanism for register and decimal indicators*

As is disclosed in detail in the above mentioned Avery patent, separate clearing means under control of keys 373 and 1910 (Figure 1) are provided to effect clearing of the accumulator or product registers 418 and the counter or multiplier registers 1874, respectively. The same keys 373 and 1910 are preferably employed to effect clearing of the decimal indicators for the respective two registers.

Referring to Figure 16, the accumulator register clearing shaft 320' has an arm 372' secured thereto which is engaged by a roller 371' carried by a second arm 370', which is secured to the carriage supporting shaft 259 (Figures 2, 6, and 16). An arm 368 is splined to the shaft 259 and is connected by means of a link 476 to a cam follower lever 371 pivoted on a shaft 478 and having a roller 479 mounted thereon and engaging with the periphery of an accumulator clear cam 480. This cam is operated by a clutch (not shown) controlled by the clear key 373 (Figure 1) and, when rotated, acts to rock arm 471 first clockwise and then counter-clockwise. This rocking movement is transmitted by the link 476 and arm 368 to the shaft 259 and then to the arms 370' and 372' to the accumulator clearing shaft 320' to effect clearing of the accumulator register. The arm 370' has an inclined deflector lug 484 (Figures 5 and 16) extending upwardly therefrom and adapted, upon rocking movement of the arm 370', to engage the end of shaft 300 and cam the same toward the left, as viewed in Figure 5, compressing spring 294. Situated adjacent each of the decimal sleeves 303 is a collar 485, pinned to the shaft 300, and adapted on leftward movement of the shaft 300 by the deflector lug 484, to engage and shift leftwardly any slide 303 which had previously been moved to the right relative to the carriage 250, thereby canceling any and all decimal indications visible through the accumulator register decimal sight openings 301.

The counter register clearing shaft 1921 has an arm 1920 (Figure 16) secured thereto and engaged by a roller 1919', carried by a second arm 1919, secured to the upper carriage supporting shaft 260. The shaft 260 has splined thereto an arm 1917 which is pivotally connected, by means of a link 1918, to a cam follower arm 1916 rockable on the shaft 478. A roller 1914 on the lower end of the lever 1916 engages the periphery of a counterclear cam 1915 which is operated by a suitable clutch under control of the clear key 1910 (Figure 1). Therefore, rotation of the cam 1915 will effect a rocking movement of the shaft 260 and, consequently, through the arms 1919 and 1920, will cause rocking of the counter clear shaft 1921 to clear the counter register. Also in engagement with the roller 1919', is a lever 486 pivoted at 487 to the carriage end plate 302, and urged in a clockwise direction into engagement with the roller 1919' by a spring 489 tensioned between the lever 486 and a pin extending from the end plate 302. Lever 486 has an inclined deflector lug 488 which, upon rocking movement of the lever 486 by the arm 1919 is adapted to engage and cam the shaft 318 (Figures 5 and 16) to the left, causing the collars 325 to force any released sleeve 321 against the lugs 255a until the corresponding rod 326 (Figure 2) is adapted to snap into locking engagement with the sleeve under the action of a spring 490, tensioned between the bell crank 328 and a pin suitably secured to one of the carriage plates 255.

Rocking of the carriage supporting shaft 259 to effect clearance of the accumulator register and decimal indicators therefore is also effective to shift the interlock bar 379 (Figure 6) to its leftmost illustrated position, and for this purpose an arm 491 is splined to the shaft 259. Suitable guide means (not shown) is provided to prevent movement of the lever 491 along with endwise shifting of the shaft 259, and a pin 492 is mounted on the lower end thereof, which engages a slot formed in a lever 493 suitably pivoted on a stud 494. A pin 495 extends from the lowermost end of the lever 493 and, upon counter-clockwise rocking of the shaft 259 by the cam 480 (Figure 16) under control of the clear key 373 (Figure 1), the pin 495 engages the rightmost end of the bar 379 to move the same leftwardly. Thus the various interlocks 376 are moved from interlocking relation with their respective keys 2000.

If desired, the lever 486 (Figure 16) may be eliminated and a deflector lug (not shown) may be secured to the arm 372' in a position wherein it is adapted to engage and cam the shaft 318 toward the left, as viewed in Figure 5. Thus the clearing of both the accumulator decimal indicating mechanism and the counter decimal indicating mechanism may be effected upon clearing of the accumulator register under control of the key 373 (Figure 1).

As an alternative arrangement, an extension (not shown) may be mounted on the bar 379 (Figure 6) in a position wherein it is adapted to be engaged by a suitable lever splined to the upper carriage supporting shaft 260 (Figures 2 and 16) whereby to enable the bar 379 to be restored to its position illustrated in Figure 6, upon clearance of either the accumulator or counter registers.

*Modified multiplier control*

Figure 23:
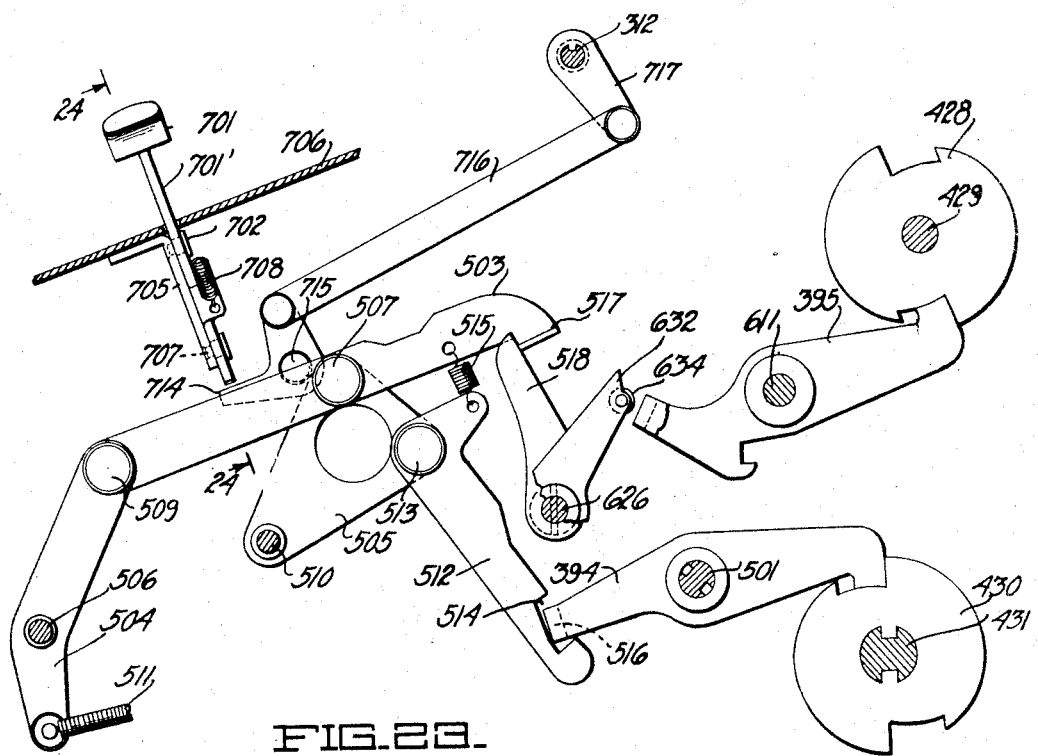
Figure 23 is a sectional elevational view of a modified form of multiplier control mechanism and means for automatically setting the multiplier decimal.
Figure 24:
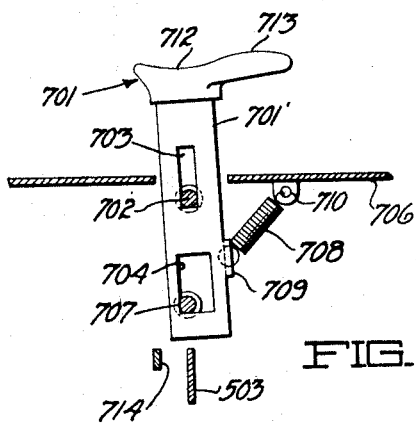
Figure 24 is a sectional view taken along the line 24—24 of Figure 23, illustrating a modified form of multiplier control key.

Figures 23 and 24 illustrate a modified form of multiplier decimal setting mechanism as applied to the commercially known Model D Marchant calculating machine. In this arrangement, multiplication is effected by maintaining the main clutch 428 in engagement for a desired number of cycles counted by the operator, and thereafter operating such manual control to cause the clutch to be disengaged. For complete details of such type of multiplier control, reference may be had to the application of Harold T. Avery, Serial Number 653,207 filed January twenty-third, 1933, and since matured into Patent Number 2,229,630, issued on January twenty-eighth, 1941.

Since the details of the mechanism controlled by the setting clutch 430 for engaging the main clutch 428 are intended to be the same as that illustrated in Figure 17, reference is had to that figure and to the description pertaining to the same for an understanding of the function of both of these clutches.

A multiplier key 701 is provided to control multiplication and also to selectively effect rocking of the shaft 312 for the purpose of setting up an indication of the decimal point in the accumulator and counter registers in the same manner as is disclosed in connection with Figures 5 and 6. The key stem 701' of key 701 is provided with a narrow upper slot 703 and a wide lower slot 704, the former of which embraces a shoulder stud 702 mounted on a bracket 705 (Figure 23) which is suitably secured to the under surface of the keyboard cover plate 706. The slot 704 is movable along a second shoulder stud 707 also secured to the bracket 705, and the key is normally rocked into an extreme counter-clockwise position with the leftmost edge of slot 704 (Figure 24) in engagement with the stud 707, by a spring 708 which is tensioned between an ear 709 on the key stem 701' and a lug 710, depending from the keyboard cover plate 706. The spring 708 also tends to maintain the key 701 in its raised illustrated position.

Upon depression of the key 701, the foremost edge of the key stem 701' thereof strikes a bar 503 pivotally connected to a frame 505 by a pin 507, and also pivotally connected to a lever 504 by a pin 509. The frame 505 and lever 504 form a parallel link arrangement and are pivoted at 510 and 506, respectively, to the machine framework. A spring 511 is tensioned between the rear end of the lever 504 and a portion of the machine framework, to normally maintain the bar 503 in its upper illustrated position. A link 512 is pivotally connected to the frame 505 by a pin 513, and has a notch 514 on the lower end thereof which, by means of a spring 515 tensioned between the short arm of the link 512 and the bar 503, normally holds the link 512 with the notch 514 thereof embracing an ear 516 formed on the hereinbefore mentioned setting clutch dog 394.

As the bar 503 is rocked rightward and downward by depression of the key 701 to cause the link 512 to move the setting clutch dog 394 from disengaging position relative to the setting clutch 430, an ear 517 on the bar 503 is moved away from an arm 518 pinned on the shaft 626 to allow the tension spring 633 (Figure 17) to rock the main clutch latch 632, described hereinbefore, into latching relation with the main clutch dog 395 for the purpose of holding this dog out of clutch releasing engagement with the main clutch 428 when this dog has been so rocked by operation of the setting clutch 430. Also the link 512 will be rocked out of engagement with the dog 394 by means not shown, enabling the setting shaft to come to rest at the end of its first cycle. Therefore the machine will continue to cycle until the operator allows the key 701 to be raised. As the bar 503 rises, the ear 517 engages the arm 518 to rock the latch 632 from engagement with the main clutch dog 395, permitting the tension spring 612 (Figure 17) to cause the dog 395 to disengage the main clutch 428.

It will be noted on reference to Figure 24, that the multiplier key 701 is provided with a concave portion 712 directly over the key stem 701', and with a convex portion 713 offset from the key stem. By striking the concave portion 712, by downward movement of one finger, the spring 708 will cause the left edge of the enlarged slot 704 to be guided along the stud 707 and therefore enable the key stem 701' to strike the bar 503, but to miss a forwardly extending arm of a bell crank 714 which is pivotally mounted on the framework by a pivot pin 715 in position adjacent the bar 503. However, upon striking the convex portion 713 with a downward force, the key will fulcrum about the pin 702 against the action of the spring 708, and thus cause the right hand edge of the slot 704 to engage the stud 707. When in this position, the key stem 701' will be in a position to strike both the bar 503 and the extending arm of the bell crank 714, and rock both of these members during its downward travel. The bell crank 714 is connected by means of a link 716 (Figure 23) with an arm 717 secured to the shaft 312 so as to rock this shaft into active engagement for the purpose described hereinabove in connection with Figures 2, 5, and 6.

Subsequent shifting of the carriage effected either manually or by power derived from the motor, will then effect setting of the decimal indicators in the manner described in connection with the preferred embodiment of the invention.

Figure 25:
Figure 25 is a plan view of the multiplier control key of Figures 23 and 24.

If desired, suitable indicia such as illustrated in Figure 25 may be applied to the convex and concave portions of the key 701 to facilitate determining which part of the key should be struck during a multiplication operation involving decimals.

I claim:

1. In a calculating machine, the combination with a product register, an actuator therefor, multiplicand selecting means for controlling said actuator, and multiplier mechanism for controlling said actuator including multiplier selection mechanism; of means for indicating the decimal point of a product on said product register, settable means for setting up a representation of a decimal point in a multiplicand factor on said multiplicand selecting means, means controlled by an element of said multiplier selection mechanism for setting up a representation of a decimal point of a multiplier factor, and means controlled jointly by said settable means and by said last mentioned means for controlling operation of said product decimal point indicating means.

2. In a calculating machine, the combination with a product register, an actuator therefor, multiplicand selecting means for controlling said actuator, and multiplier mechanism for controlling said actuator including a series of depressible multiplier value selecting keys; of means for indicating the decimal point of a product appearing on said product register, settable means for setting up a representation of a decimal point of a multiplicand factor, means operable upon depression of certain of said keys for setting up a representation of a decimal point of a multiplier factor, and means controlled jointly by said settable means and by said last mentioned means for controlling operation of said product decimal point indicating means.

3. In a calculating machine, the combination with a product register, an actuator therefor, multiplicand selecting means for controlling said actuator, and multiplier mechanism for controlling said actuator including a series of depressible multiplier value selecting keys; of means for indicating the decimal point of a product appearing on said product register, settable means for setting up a representation of a decimal point of a multiplicand factor, means comprising a second series of depressible multiplier value keys corresponding to said first mentioned series for setting up a representation of a decimal point of a multiplier factor, and for depressing the corresponding key of said first mentioned series of keys, and means controlled jointly by said settable means and by said last mentioned means for controlling operation of said product decimal point indicating means.

4. In a calculating machine, the combination with a frame, a carriage movable relative to said frame, a product register carried by said carriage, an actuator for said register means for selecting a multiplicand and for controlling said actuator accordingly, and multiplier mechanism for controlling said actuator including a multiplier selection mechanism; of decimal point indicating means for said register normally ineffective to indicate the position of the decimal point, settable means for setting up a representation of a decimal point of said multiplicand factor, means comprising said carriage for rendering said decimal point indicating means effective on movement of said carriage, means comprising said multiplier selection mechanism for setting up a representation of a decimal point of a multiplier factor, and means controlled jointly by said settable means and by said last mentioned means for controlling an element of said means for rendering said decimal point indicating means effective.

5. In a calculating machine, the combination with a frame, a carriage movable relative to said frame, a register carried by said carriage, an actuator therefor, selectively settable means for representing one factor of a calculation and for controlling said actuator accordingly, and selectively settable means for representing a second factor of a calculation and for accordingly controlling said actuator concurrently with said first mentioned selectively settable means; of means for indicating a decimal point of the result of said calculation appearing on said register comprising a plurality of decimal point indicators, one for each order of said register; each of said indicators being normally out of decimal point indicating position, settable means for setting up a representation of a decimal point of said first mentioned factor, means for moving certain of said indicators to indicating position comprising a shaft, a plurality of members slidably keyed to said shaft, means for rocking said shaft to position said members to engage and move certain of said indicators to decimal point indicating position on movement of said carriage relative to said frame, and means operable by said settable means for sliding certain of said members along said shaft to a position wherein said certain members are adapted to engage certain of said indicators in advance of engagement of others of said indicators by others of said members.

6. In a calculating machine, the combination with a frame, a carriage movable relative to said frame, a register carried by said carriage, an actuator therefor, selectively settable means for representing one factor of a calculation and for controlling said actuator accordingly, selectively settable means for representing a second factor of a calculation and for accordingly controlling said actuator concurrently with said first mentioned selectively settable means; of means for indicating a decimal point of the result of said calculation appearing on said register comprising a plurality of decimal point indicators, one for each order of said register; each of said indicators being normally out of decimal point indicating position, settable means for setting up a representation of a decimal point of said first mentioned factor, means for moving certain of said indicators to indicating position comprising a shaft, a plurality of members slidably keyed to said shaft, means for rocking said shaft to position said members to engage and move certain of said indicators to decimal point indicating position on movement of said carriage relative to said frame, means operable by said settable means for sliding certain of said members along said shaft to a position wherein said certain members are adapted to engage certain of said indicators in advance of engagement of others of said indicators by others of said members, and means operable after engagement of said certain members by said certain indicators to rock said shaft to remove all of said members from the path of movement of said indicators in advance of engagement of said others of said indicators by said others of said members.

7. In a calculating machine, the combination with a frame, a carriage movable relative to said frame, a product register carried by said carriage, an actuator therefor, multiplicand selecting means for controlling said actuator, comprising a multi-order keyboard; multiplier mechanism for controlling said actuator, automatic means controlled by said multiplier mechanism for effecting shifting movement of said carriage; of means for indicating the decimal point of a product appearing on said product register, a shaft, a plurality of members slidably keyed to said shaft, means for rocking said shaft to position said members to engage and move certain of said indicators to decimal indicating position on movement of said carriage relative to said frame, a decimal marker between each two adjacent orders of said keyboard and selectively settable to indicate the decimal place of a factor set up on said keyboard, means connecting each of said markers to one of said members, respectively, said connecting means being operable on setting of said marker to decimal indicating position to slide the respective one of said markers along said shaft to a position wherein said member will engage one of said indicators and move the same to indicating position in advance of engagement of the others of said indicators by others of said members.

8. In a calculating machine, the combination with a register, of means for indicating the decimal point of a value appearing on said register comprising a shaft, a plurality of decimal point indicators on said shaft, one for each order of said register, means for moving any of said indicators on said shaft to decimal point indicating position, means for moving said shaft, and means operable by said shaft upon movement thereof for moving said indicators out of said decimal point indicating positions.

9. In a calculating machine, the combination with a register, of means for indicating the decimal point of a value appearing on said register comprising a shaft, a plurality of decimal point indicators slidable on said shaft, one for each order of said register, means for sliding any of said indicators to decimal point indicating position, means for moving said shaft, means operable by said shaft upon movement thereof for sliding said indicators out of said decimal point indicating positions, and means for clearing said register, said shaft moving means being operable by said clearing means.

10. In a calculating machine, the combination with a cyclic actuating mechanism, means comprising selectively settable means for controlling said mechanism to operate a number of cycles depending upon the setting of said settable means, means comprising a series of depressible value keys for setting said settable means, each of said keys being operable to set said settable means in accordance with the value of said key; of a second mechanism including decimal point indicator control means movable from inoperative position to operative position, means comprising a second series of depressible keys corresponding in value to said first mentioned series, each of said second series of keys being operable upon depression thereof to control setting of said settable means in accordance with the value thereof and to control movement of said control means from one of said positions thereof to the other.

11. In a calculating machine, the combination with a cyclic actuating mechanism, means comprising selectively settable means for controlling said mechanism to operate a number of cycles depending upon the setting of said settable means, means comprising a series of depressible value keys for setting said settable means, each of said keys being operable to set said settable means in accordance with the value of said key; of a second mechanism including decimal point indicator control means movable from inoperative position to operative position, means comprising a second series of depressible keys corresponding in value to said first mentioned series, each of said second series of keys being operable upon depression thereof to control setting of said settable means in accordance with the value thereof and to control movement of said control means from one of said positions thereof to the other, and means operable upon depression of a key of said second series for preventing subsequent actuation of said control means by a second key of said second series.

12. In a calculating machine, the combination with a product register, an actuator therefor, multiplicand selecting means for controlling said actuator, and cyclic multiplier mechanism for controlling said actuator comprising selectively settable means for controlling said multiplier mechanism to operate a number of cycles depending upon the setting of said settable means; and means comprising a series of depressible value keys for setting said settable means; each of said keys being operable to set said settable means in accordance with the value of said key; of means for indicating the decimal point of a product appearing on said product register, comprising control means movable from inoperative position to operative position, and means comprising a second series of depressible keys corresponding in value to said first mentioned series, each of said second series of keys being operable upon depression thereof to control setting of said settable means in accordance with the value thereof and to control movement of said control means from one of said positions thereof to the other.

13. In a calculating machine, the combination with a product register, an actuator therefor, multiplicand selecting means for controlling said actuator, and cyclic multiplier mechanism for controlling said actuator comprising selectively settable means for controlling said multiplier mechanism to operate a number of cycles depending upon the setting of said settable means; and means comprising a series of depressible value keys for setting said settable means, each of said keys being operable to set said settable means in accordance with the value of said key; of means for indicating the decimal point of a product appearing on said product register, comprising control means movable from inoperative position to operative position, means comprising a second series of depressible keys corresponding in value to said first mentioned series, each of said second series of keys being operable upon depression thereof to control setting of said settable means in accordance with the value thereof and to control movement of said control means from one of said positions thereof to the other, and means operable upon depression of a key of said second series for preventing subsequent control of said control means by a second key of said second series.

14. In a calculating machine, the combination with a product register, an actuator therefor, multiplicand selecting means for controlling said actuator, and cyclic multiplier mechanism for controlling said actuator comprising selectively settable means for controlling said multiplier mechanism to operate a number of cycles depending upon the setting of said settable means; and means comprising a series of depressible value keys for setting said settable means, each of said keys being operable to set said settable means in accordance with the value of said key; of means for indicating the decimal point of a product appearing on said product register, comprising control means movable from inoperative position to operative position, means comprising a second series of depressible keys corresponding in value to said first mentioned series, each of said second series of keys being operable upon depression thereof to control setting of said settable means in accordance with the value thereof and to control movement of said control means from one of said positions thereof to the other, means operable upon depression of a key of said second series for preventing subsequent control of said control means by a second key of said second series, means for clearing said register comprising an operating member, and means operable by said member for rendering said control preventing means ineffective.

15. In a calculating machine, the combination with a product register, an actuator therefor, multiplicand selecting means for controlling said actuator, and mechanism for controlling said actuator to effect multiplication, including a depressible key; of means for indicating the decimal point of a product appearing on said product register, comprising control means movable from inoperative position to operative position; means supporting said key for movement in different directions, means actuated by said key upon movement thereof in one of said directions for controlling operation of said actuator controlling mechanism solely, and means actuated by said key upon movement thereof in another of said directions for controlling operation of said actuator controlling mechanism and for controlling movement of said control means from said inoperative position thereof to said operative position.

16. In a calculating machine, the combination with a product register, an actuator therefor, multiplicand selecting means for controlling said actuator, and mechanism for controlling said actuator to effect multiplication, including a depressible key; of means for indicating the decimal point of a product appearing on said product register, comprising control means movable from inoperative position to operative position, means supporting said key for movement in different directions, means actuated by said key upon movement thereof in one of said directions for controlling operation of said actuator controlling mechanism solely, means actuated by said key upon movement thereof in another of said directions for controlling operation of said actuator controlling mechanism and for controlling movement of said control means from said inoperative position thereof to said operative position, and resilient means tending to guide said key for movement in one of said directions.

17. In a calculating machine having a shiftable carriage, a decimal point indicating mechanism comprising an indicator movable to concealed and displayed positions, spring means for moving said indicator to displayed position, a latch for retaining said indicator in concealed position, and means operable by said carriage during shifting thereof for releasing said latch.

18. In a calculating machine, the combination with a product register and an actuator therefor, multiplicand selecting means for controlling said actuator, multiplier mechanism for controlling said actuator comprising a series of depressible value keys, means controlled by said keys for initiating operation of said actuator, and means for preventing control of said actuator by one of said keys until substantial completion of operation of the machine under control of another of said keys; of decimal point indicating mechanism for said product register including control means movable from inoperative position to operative position, manually controlled means for moving said control means to operative position, means for preventing movement of said control means by said manually controlled means, and means actuated in timed relationship with said first mentioned preventing means for disabling said last mentioned preventing means.

19. In a calculating machine, the combination with a product register, an actuator therefor, multiplicand selecting means for controlling said actuator, multiplier mechanism for controlling said actuator comprising a series of depressible value keys; means controlled by said keys for initiating operation of said actuator, and means for preventing control of said actuator by one of said keys until substantial completion of operation of the machine under control of another of said keys; of decimal point indicating mechanism for said product register including control means movable from inoperative position to operative position, spring means for moving said control means from inoperative position to operative position, manually operable means for energizing said spring means, means for preventing movement of said control means by said spring means, and means actuated in timed relationship with said first mentioned preventing means for disabling said last mentioned preventing means.

20. In a calculating machine, the combination with a product register, an actuator therefor, multiplicand selecting means for controlling said actuator, and multiplier mechanism for controlling said actuator including multiplier selecting means; of settable means for setting up a representation of a decimal point in a multiplicand factor set up on said multiplicand selecting means, means for setting up a representation of a decimal point of a multiplier factor set up on said multiplier selecting means, and means rendered effective jointly by said settable means, said multiplier selecting means and said multiplier decimal point representation setting means for indicating the decimal point of a product in said product register.

21. In a calculating machine, the combination with a product register, an actuator therefor, multiplicand selecting means for controlling said actuator, and multiplier mechanism for controlling said actuator including a series of depressible value selecting keys; of settable means for setting up a representation of a decimal point in a multiplicand factor set up on said multiplicand selecting means, means for setting up a representation of a decimal point of a multiplier factor set up on said multiplier selecting means, and means rendered effective jointly by said settable means, a depressed one of said keys, and said multiplier decimal point representation setting means for indicating the decimal point of a product in said product register.

22. In a calculating machine, the combination with a shiftable carriage, means for shifting said carriage, and a register on said carriage; of a decimal point indicating mechanism for said register comprising a decimal point indicator movable longitudinally of said register, spring means for moving said indicator to one position with respect to said register, a latch for retaining said indicator in a second position with respect to said register, a depressible key mounted on a portion of the machine with respect to which the carriage is shiftable, and means controlled by said key for releasing said latch.

23. In a calculating machine having a shiftable carriage, a decimal point indicating mechanism therefor comprising an indicator movable to concealed and displayed positions, spring means for moving said indicator to displayed position, a latch for retaining said indicator in concealed position, a depressible key, and means rendered effective jointly by said key upon depression thereof and said carriage during shifting thereof, for releasing said latch.

24. In a calculating machine having a register, decimal point indicating means for said register comprising a decimal point indicator movable longitudinally with respect to said register, spring means for moving said indicator from one position to a second position with respect to said register, a latch for retaining said indicator in said first position, a depressible key, and means controlled by said key for releasing said latch.

25. In a calculating machine having a frame, a carriage shiftable relative to said frame, and a register carried by said carriage; decimal point indicating means for said register comprising a decimal point indicator carried by said carriage and shiftable longitudinally of said register, stop means adapted to be rendered effective and ineffective to arrest shifting movement of said decimal point indicator relative to said frame during shifting movement of said carriage, a depressible key, and means controlled by said key upon depression thereof for controlling said stop means.

26. In a calculating machine having a frame, a carriage shiftable relative to said frame, and a register carried by said carriage; decimal point indicating means for said register comprising a decimal point indicator carried by said carriage and shiftable longitudinally of said register, a stop member, means on said frame supporting said stop member for movement into an arresting position to arrest shifting movement of said decimal point indicator relative thereto during shifting movement of said carriage, a depressible key, and means controlled by said key upon depression thereof for moving said member into said arresting position.

27. In a calculating machine having a frame, a carriage shiftable relative to said frame, and a register carried by said carriage; decimal point indicating means for said register comprising a decimal point indicator carried by said carriage and shiftable longitudinally of said register, stop means adapted to be rendered effective and ineffective to arrest shifting movement of said decimal point indicator relative to said frame during said shifting movement of said carriage, and manually controlled means for controlling said stop means.

28. In a calculating machine having registering mechanism, actuating mechanism therefor and multiplication control mechanism comprising a series of multiplier factor entering keys and means controlled thereby for initiating operation of said registering mechanism by said actuating mechanism; the combination of an ordinal multiplier factor register, means for indicating the position of the decimal point in a factor entered in said register, means controlled by said multiplier factor entering keys for successively entering the digits of a factor in said register, a single decimal control mechanism settable at any time during such entry of a multiplier factor, and means controlled by said decimal control mechanism and responsive to the operation of said multiplier digit entering means for setting the aforesaid means for indicating the position of the decimal point in the factor entered in said register.

29. In a calculating machine having factor indicating means including numeral wheels, actuating means for entering factor numeral values in said numeral wheels, means comprising numeral key mechanism for controlling said actuating means; in combination with settable factor decimal indicating means for representing the decimal value of the factor in said numeral wheels, decimal key mechanism, and means controlled jointly by said numeral key mechanism and said decimal key mechanism for determining the setting of said decimal indicating means.

30. In a calculating machine having registering mechanism, actuating mechanism therefor, factor indicating mechanism, and settable means for indicating the position of the decimal point in a factor indicated upon said factor indicating mechanism; the combination of control mechanism for concurrently controlling the entry of factors into said factor indicating mechanism and the operation of said actuating mechanism, selectively operable decimal and numeral keys for actuating said control mechanism, and means jointly controlled by said decimal keys and said control mechanism for setting the aforesaid means for indicating the position of the decimal point in a factor indicated upon said factor indicating mechanism.

31. In a calculating machine, a product register including numeral wheels, product decimal indicating means for said register, and actuating means for said register; in combination with multiplicand numeral setting means for controlling said actuating means, multiplicand decimal setting means, multiplier numeral setting means for controlling said actuating means, multiplier decimal setting means, and means controlled jointly by said two mentioned decimal setting means and said multiplier numeral setting means for determining the positioning of said product decimal indicating means with respect to said numeral wheels to indicate the position of the decimal point in a product in said register.

32. In a calculating machine having a numeral indicator, a decimal indicator therefor, actuating means for entering a numeral value in said numeral indicator, and means for moving said decimal indicator from a normal position to a position indicative of the position of the decimal point in said numeral value; in combination with clearing mechanism operable to zeroize said numeral indicator and to restore said decimal indicator to said normal position, and a clearance initiating member for causing operation of said clearing mechanism.

GRANT C. ELLERBECK.